United States Patent
Zhang et al.

(10) Patent No.: US 12,335,531 B2
(45) Date of Patent: Jun. 17, 2025

(54) INTRA BLOCK COPY CODING AND DECODING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Jizheng Xu, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/510,423

(22) Filed: Nov. 15, 2023

(65) Prior Publication Data
US 2024/0089507 A1  Mar. 14, 2024

Related U.S. Application Data

(63) Continuation of application No. 17/689,709, filed on Mar. 8, 2022, now Pat. No. 12,069,309, which is a
(Continued)

(30) Foreign Application Priority Data

Sep. 9, 2019  (WO) ................ PCT/CN2019/104869

(51) Int. Cl.
*H04N 19/70* (2014.01)
*H04N 19/119* (2014.01)
(Continued)

(52) U.S. Cl.
CPC ........... *H04N 19/70* (2014.11); *H04N 19/119* (2014.11); *H04N 19/124* (2014.11);
(Continued)

(58) Field of Classification Search
None
See application file for complete search history.

(56) References Cited

U.S. PATENT DOCUMENTS 9,591,325 B2   3/2017  Li
9,877,043 B2   1/2018  He
(Continued)

FOREIGN PATENT DOCUMENTS

| CN | 105917650 A | 8/2016 |
|---|---|---|
| CN | 107079161 A | 8/2017 |

(Continued)

OTHER PUBLICATIONS

JVET-O2001-Ve(v14)—Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
(Continued)

*Primary Examiner* — Samuel D Fereja
(74) *Attorney, Agent, or Firm* — Conley Rose, P.C.

(57) ABSTRACT

A method of video processing includes determining, for a conversion between a current block of a video and a coded representation of the video, whether a syntax element indicating usage of a skip mode for an intra-block copy (IBC) coding model is included in the coded representation according to a rule that specifies that signaling of the syntax element is based on a dimension of the current block and/or a maximum allowed dimension for a block that is coded using the IBC coding model. The method also includes performing the conversion based on the determining.

18 Claims, 27 Drawing Sheets

Related U.S. Application Data continuation of application No. PCT/CN2020/114232, filed on Sep. 9, 2020.

(51) Int. Cl.
  *H04N 19/124* (2014.01)
  *H04N 19/132* (2014.01)
  *H04N 19/159* (2014.01)
  *H04N 19/176* (2014.01)
  *H04N 19/593* (2014.01)

(52) U.S. Cl.
  CPC ......... *H04N 19/132* (2014.11); *H04N 19/159* (2014.11); *H04N 19/176* (2014.11); *H04N 19/593* (2014.11)

(56) References Cited

U.S. PATENT DOCUMENTS

| | | |
|---|---|---|
| 9,883,197 B2 | 1/2018 | Chen |
| 9,918,105 B2 | 3/2018 | Pang |
| 10,148,981 B2 | 12/2018 | Zhu |
| 10,284,874 B2 | 5/2019 | He |
| 10,306,240 B2 | 5/2019 | Xiu |
| 10,368,091 B2 | 7/2019 | Li |
| 10,368,092 B2 | 7/2019 | Li |
| 10,469,863 B2 | 11/2019 | Zhu |
| 10,582,213 B2 | 3/2020 | Li |
| 10,638,140 B2 | 4/2020 | Seregin |
| 10,812,817 B2 | 10/2020 | Li |
| 11,095,917 B2 | 8/2021 | Zhang |
| 12,069,309 B2 | 8/2024 | Zhang |
| 2014/0376634 A1 | 12/2014 | Guo |
| 2015/0139296 A1 | 5/2015 | Yu |
| 2016/0100189 A1 | 4/2016 | Pang et al. |
| 2016/0353117 A1 | 12/2016 | Seregin |
| 2019/0068967 A1 | 2/2019 | Ikai |
| 2019/0200038 A1 | 6/2019 | He |
| 2019/0238864 A1 | 8/2019 | Xiu |
| 2020/0092579 A1 | 3/2020 | Zhu |
| 2020/0096686 A1 | 3/2020 | Cool |
| 2020/0177910 A1 | 6/2020 | Li |
| 2020/0195960 A1 | 6/2020 | Zhang |
| 2020/0252605 A1* | 8/2020 | Xu .................. H04N 19/593 |
| 2020/0389661 A1* | 12/2020 | Zhao .................. H04N 19/134 |
| 2020/0396465 A1 | 12/2020 | Zhang |
| 2020/0404255 A1 | 12/2020 | Zhang |
| 2020/0404260 A1 | 12/2020 | Zhang |
| 2020/0404300 A1 | 12/2020 | Seregin |
| 2020/0413048 A1 | 12/2020 | Zhang |
| 2021/0022811 A1 | 1/2021 | Xu |
| 2021/0044816 A1* | 2/2021 | Xu .................. H04N 19/105 |
| 2021/0092394 A1 | 3/2021 | Tsai |
| 2021/0160533 A1 | 5/2021 | Zhang |
| 2021/0203958 A1 | 7/2021 | Zhang |
| 2021/0235074 A1 | 7/2021 | Liu |
| 2021/0250592 A1 | 8/2021 | Xiu |
| 2021/0274201 A1 | 9/2021 | Xu |
| 2021/0274202 A1 | 9/2021 | Xu |
| 2021/0281856 A1 | 9/2021 | Liu |
| 2021/0281877 A1 | 9/2021 | Liu |
| 2021/0297662 A1* | 9/2021 | Ko .................. H04N 19/186 |
| 2021/0297674 A1 | 9/2021 | Xu |
| 2021/0314610 A1 | 10/2021 | Xu |
| 2021/0329233 A1 | 10/2021 | Tsai |
| 2021/0352279 A1 | 11/2021 | Xu |
| 2021/0360270 A1 | 11/2021 | Xu |
| 2021/0368164 A1 | 11/2021 | Xu |
| 2021/0368178 A1 | 11/2021 | Xu |
| 2021/0377561 A1 | 12/2021 | Zhang |
| 2021/0392341 A1 | 12/2021 | Zhang |
| 2022/0038741 A1* | 2/2022 | Nam .................. H04N 19/61 |
| 2022/0124347 A1 | 4/2022 | Chen |
| 2022/0182614 A1* | 6/2022 | Jang .................. H04N 19/11 |
| 2022/0201285 A1 | 6/2022 | Jang |
| 2022/0210411 A1 | 6/2022 | Zhang |
| 2022/0256189 A1 | 8/2022 | Lee |
| 2022/0264136 A1 | 8/2022 | Chen |

FOREIGN PATENT DOCUMENTS

| | | |
|---|---|---|
| CN | 107409218 A | 11/2017 |
| CN | 107852490 A | 3/2018 |
| CN | 107925773 A | 4/2018 |
| CN | 108293109 A | 7/2018 |
| CN | 108432246 A | 8/2018 |
| CN | 108632611 A | 10/2018 |
| CN | 109076242 A | 12/2018 |
| CN | 110024410 A | 7/2019 |
| EP | 2680584 A1 | 1/2014 |
| EP | 3253059 A1 | 12/2017 |
| EP | 3349455 A1 | 7/2018 |
| WO | 2012138032 A1 | 10/2012 |
| WO | 2015192353 A1 | 12/2015 |
| WO | 2016057938 A1 | 4/2016 |
| WO | 2016196843 A1 | 12/2016 |
| WO | 2017157249 A1 | 9/2017 |
| WO | 2017205701 A1 | 11/2017 |
| WO | 2018199468 A1 | 11/2018 |
| WO | 2018217024 A1 | 11/2018 |
| WO | 2019141012 A1 | 7/2019 |

OTHER PUBLICATIONS https://vcgit.hhi.fraunhofer.de/jvet/VVCSoftware_VTM/tags/VTM-6.0, Jun. 3, 2022.

JVET-N0340—Wang et al. "CE4-related: An Improved Method for Triangle Merge List Construction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0340, 2019.

JVET-L0054—Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0054, 2018.

JVET-N1001-v10—Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.

JVET-N0843—Xu et al. "CE8-related: Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0843, 2019.

JVET-M0147-v7—Sethuraman et al. "CE9: Results of DMVR Related Tests CE9.2.1 and CE9.2.2," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0147, 2019.

JVET-K0099—SALEHIFAR et al. "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0099, 2018.

JVET-L0133-r4—Koo et al. "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0133, 2018.

JVET-O1001-v14—Yau et al. "Crosscheck of JVET-O0312 (Non-CE3: Simplifications of MIP)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVETO1001, 2019.

"Information Technology—High Efficiency Coding and Media Delivery in Heterogeneous Environments—Part 2: High Efficiency Video Coding" Apr. 20, 2018, ISO/DIS 23008, 4th Edition.

Rosewarne et al. "High Efficiency Video Coding (HEVC) Test Model 16 (HM 16) Improved Encoder Description Update 7," Joint Collaborative Team on Video Coding (JCT-VC) of ITU-T SG16

(56) References Cited

OTHER PUBLICATIONS

WP3 and ISO/IEC JTC1/SC29/ WG11 25th Meeting: Chengdu, CN, Oct. 14-21, 2016, document JCTVC-Y1002, 2016.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
JEM-7.0: https://jvet.hhi.fraunhofer.de/svn/svn_HMJEMSoftware/tags/ HM-16.6-JEM-7.0, Jun. 3, 2022.
Yoo et al. "CE8-Related : Unified Condition Between BDPCM and Transform Skip," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0206, 2019.
Tsang et al. "Reduced-Complexity Intra Block Copy (IntraBC) Mode with Early CU Splitting and Pruning for HEVC Screen Content Coding," IEEE Transactions on Multimedia, Feb. 2019, 21(2):269-283.
JVET-O0258—Zhu et al. "Non-CE8: Adaptive Single/Dual Tree with IBC Simplification," Joint Video Experts Team (JVET) of ITU-T SG 16 WP 3 and ISO/IEC JTC 1/SC 29/WG 11 15th Meeting, Gothenburg, SE, Jul. 3-12, 2019, document JVETO0258, 2019.
JVET-O0373—Nalci et al. "Non-CE6: An Improved Context Modeling for LFNST," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O0373, 2019.
Xu et al. "Intra Block Copy for Next Generation Video Coding," 2018 IEEE International Conference on Multimedia & Expo Workshops {ICMEW), IEEE, Jul. 23, 2018, pp. 1-4, XP033453544, retrieved on Nov. 28, 2018.
JVET-J1026—Said et al. "Description of Core Experiment 6: Transforms and Transform Signalling," Joint Video Exploration Team (JVET) of ITU-T SG 16 WP 3 and ISO/IEC JTC 1/SC 29/WG 11 10th Meeting, San Diego, US, Apr. 10-20, 2018, document JVET-J1026, 2018.
Extended European Search Report from European Patent Application No. 20862383.5 dated Sep. 29, 2022 (12 pages).
Non Final Office Action from U.S. Appl. No. 17/689,664 dated Jun. 17, 2022.
International Search Report and Written Opinion from International Patent Application No. PCT/CN2020/114230 dated Dec. 8, 2020 (10 pages).
International Search Report and Written Opinion from International Patent Application No. PCT/CN2020/114232 dated Dec. 9, 2020 (12 pages).
Non Final Office Action from U.S. Appl. No. 17/689,709 dated Feb. 24, 2023.
Final Office Action from U.S. Appl. No. 17/689,709 dated Oct. 7, 2022.
Non Final Office Action from U.S. Appl. No. 17/689,709 dated Nov. 30, 2023.
Non Final Office Action from U.S. Appl. No. 17/689,709 dated Jun. 29, 2022.
Final Office Action from U.S. Appl. No. 17/689,709 dated Jun. 28, 2023.
Chinese Office Action from Chinese Patent Application No. 202080063273.4 dated May 28, 2024, 22 pages.
Decision to Grant a Patent for Japanese Patent Application No. 2023-122019, mailed Oct. 29, 2024, 5 pages.
Notice of Grant of Invention Patent Right for chinese patent application 202080063234.4 , Oct. 22, 2024, 10 pages.
Document: JVET-P2001-vD, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 489 pages.
European Office Action from European Application No. 20862383.5 dated Aug. 14, 2024, 6 pages.

\* cited by examiner

FIG. 14

INTRA BLOCK COPY CODING AND DECODING

CROSS REFERENCE TO RELATED APPLICATIONS

This application is a continuation of U.S. application Ser. No. 17/689,709, filed on Mar. 8, 2022, which is a continuation of International Application No. PCT/CN2020/114232, filed on Sep. 9, 2020, which claims the priority to and benefits of International Patent Application No. PCT/CN2019/104869, filed on Sep. 9, 2019. All of the aforementioned patent applications are hereby incorporated by reference in their entireties.

TECHNICAL FIELD

The present disclosure relates to video and image coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video and image coding and decoding in which intra block copy tool is used for coding or decoding.

In one example aspect, a method of video processing is disclosed. The method includes determining, for a conversion between a current block in a video region of a video and a coded representation of the video, that splitting the current block into multiple transform units is permitted based on a characteristic of the current block. A signaling of the splitting is omitted in the coded representation. The method also includes performing the conversion based on the determining.

In another example aspect, a method of video processing is disclosed. The method includes determining, for a conversion between a current block in a video region of a video and a coded representation of the video, prediction samples for the current block using an intra block copy (IBC) model based on filtered reconstructed reference samples in the video region. The method also includes performing the conversion based on the determining.

In another example aspect, a method of video processing is disclosed. The method includes determining, for a conversion between a current block of a video and a coded representation of the video, whether a syntax element indicating usage of a skip mode for an intra-block copy (IBC) coding model is included in the coded representation according to a rule. The rule specifies that signaling of the syntax element is based on a dimension of the current block and/or a maximum allowed dimension for a block that is coded using the IBC coding model. The method also includes performing the conversion based on the determining.

In another example aspect, a method of video processing is disclosed. The method includes determining, for a conversion between a current block of a video and a coded representation of the video, at least one context for coding an index associated with a low-frequency non-separable transform (LFNST) coding model. The LFNST coding model comprises, during encoding, applying a forward secondary transform between a forward primary transform and a quantization step, or applying, during decoding, an inverse secondary transform between a de-quantization step and an inverse primary transform. Sizes of the forward secondary transform and the inverse secondary transform are less than a size of the current block. The at least one context is determined based on a partition type of the current block without considering the forward primary transform or the inverse primary transform. The method also includes performing the conversion according to the determining.

In another example aspect, a method of video processing is disclosed. The method includes determining, for a conversion between a current block of a video region of a video and a coded representation of the video, whether an intra-block copy (IBC) coding model is enabled based on a maximum transform unit size applicable to the video region. The method also includes performing the conversion according to the determining.

In another example aspect, a method of video processing is disclosed. The method includes determining, for a conversion between a current block a video and a coded representation of the video, that an absolute value of a component of a motion vector for the current block is split into two parts, wherein the motion vector is denoted as (Vx, Vy) and the component is denoted as Vi, Vi being either Vx or Vy. A first part of the two parts is equal to $|Vi|-((|Vi|>>N)<<N)$ and a second part of the two parts is equal to $|Vi|>>N$, N being a positive integer. The two parts are coded separately in the coded representation. The method also includes performing the conversion according to the determining.

In another example aspect, a method of video processing is disclosed. The method includes determining, for a conversion between a current block a video and a coded representation of the video, information about a maximum dimension of the current block that allows sub-block transform in the current block based on a maximum allowed dimension of a transform block. The method also includes performing the conversion according to the determining.

In another example aspect, a method of video processing is disclosed. The method includes determining, for a conversion between a coded representation of a video block in a video region and the video block based on an intra block copy tool, that splitting of the video block into multiple transform units is permitted, wherein the determining is based on a coding condition of the video block and the coded representation omits a signaling of the splitting, and performing the conversion based on the splitting.

In another example aspect, a method of video processing is disclosed. The method includes determining, for a conversion between a coded representation of a video block of a video region and the video block, whether an intra block copy (IBC) tool is enabled for the conversion of the video block based on a maximum transform size for the video region; and performing the conversion based on the determining.

In another example aspect, a method of video processing is disclosed. The method includes determining, for a conversion between a coded representation of a video block of a video region and the video block, whether a signaling of an intra block copy (IBC) tool for the conversion is included in the coded representation; and performing the conversion based on the determining, wherein the determining is based on a width and/or a height of the video block and a maximum allowed IBC block size for the video region.

In another example aspect, a method of video processing is disclosed. The method includes determining, for a conversion between a coded representation of a video block of a video region and the video block using an intra block copy (IBC) tool, that splitting of the video block into multiple transform units (TUs) is permitted for the conversion; and performing the conversion based on the determining, wherein the conversion includes use of separate motion information for the multiple TUs.

In another example aspect, a method of video processing is disclosed. The method includes determining, for a conversion between a coded representation of a video block of a video region and the video block, that an intra block copy tool is enabled for the conversion, and performing the conversion using the intra block copy tool, wherein a prediction of the video block is performed using filtered reconstructed samples of the video region.

In another example aspect, a method of video processing is disclosed. The method includes performing a conversion between a video comprising multiple video blocks and coded representation of the video, wherein at least some video blocks are coded using motion vector information and wherein the motion vector information is represented in the coded representation as a first part based on a first lower significant bits of an absolute value of the motion vector information and a second part based on remaining more significant bits that are more significant than the first lower significant bits.

In another example aspect, a method of video processing is disclosed. The method includes determining, for a conversion between a coded representation of a video block of a video region and the video block, whether a subblock transform tool is enabled for the conversion; and performing the conversion based on the determining, wherein the determining is based on a maximum allowed transform block size for the video region, and wherein a signaling is included in the coded representation conditionally based on the maximum allowed transform block size.

In another example aspect, a method of video processing is disclosed. The method includes determining, for a conversion between a coded representation of a video block of a video region and the video block, whether a low frequency non-separable transform (LFNST) is used during the conversion, and performing the conversion based on the determining; wherein the determining is based on a coding condition applied to the video block and wherein the LFNST and a matrix index for the LFNST are coded in the coded representation using two contexts.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 14 shows an example of motion vector storage.

DETAILED DESCRIPTION

Figure 1:
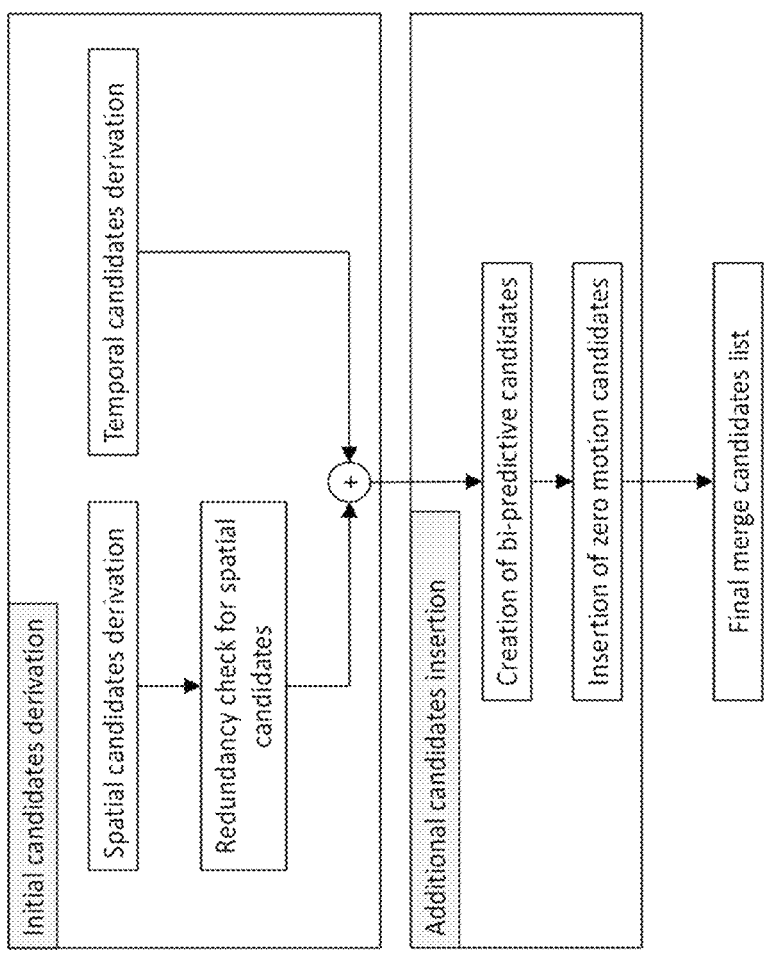
FIG. 1 shows an example derivation process for merge candidates list construction.

Embodiments of the disclosed technology may be applied to existing video coding standards (e.g., High Efficiency Video Coding (HEVC), H.265) and future standards to improve compression performance. Section headings are used in the present disclosure to improve readability of the description and do not in any way limit the discussion or the embodiments (and/or implementations) to the respective sections only.

1. Summary

This disclosure is related to video coding technologies. Specifically, it is related to intra block copy (IBC, also known as current picture referencing, CPR) coding. It may be applied to the existing video coding standard like HEVC, or the standard Versatile Video Coding (VVC) to be finalized. It may be also applicable to future video coding standards or video codec.

2. Background

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC Joint Technical Committee (JTC1) SC29/WG11 (MPEG) was created to work on the VVC standard targeting at 50% bitrate reduction compared to HEVC.

2.1 Inter Prediction in HEVC/H.265

For inter-coded coding units (CUs), it may be coded with one prediction unit (PU), 2 PUs according to partition mode. Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode
2.1.2.1. Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
  Step 1.1: Spatial candidates derivation
  Step 1.2: Redundancy check for spatial candidates
  Step 1.3: Temporal candidates derivation
Step 2: Additional candidates insertion
  Step 2.1: Creation of bi-predictive candidates
  Step 2.2: Insertion of zero motion candidates These steps are also schematically depicted in FIG. 1, which shows an example derivation process for merge candidates list construction. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 3:
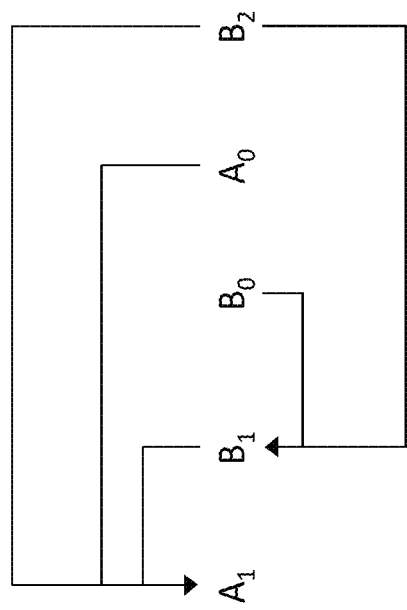
FIG. 3 shows example candidate pairs considered for redundancy check of spatial merge candidates.
Figure 2:
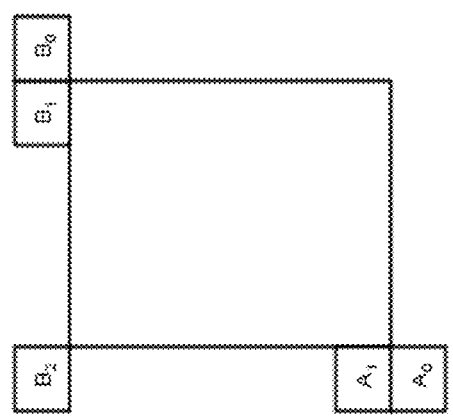
FIG. 2 shows example positions of spatial merge candidates.
Figure 4:
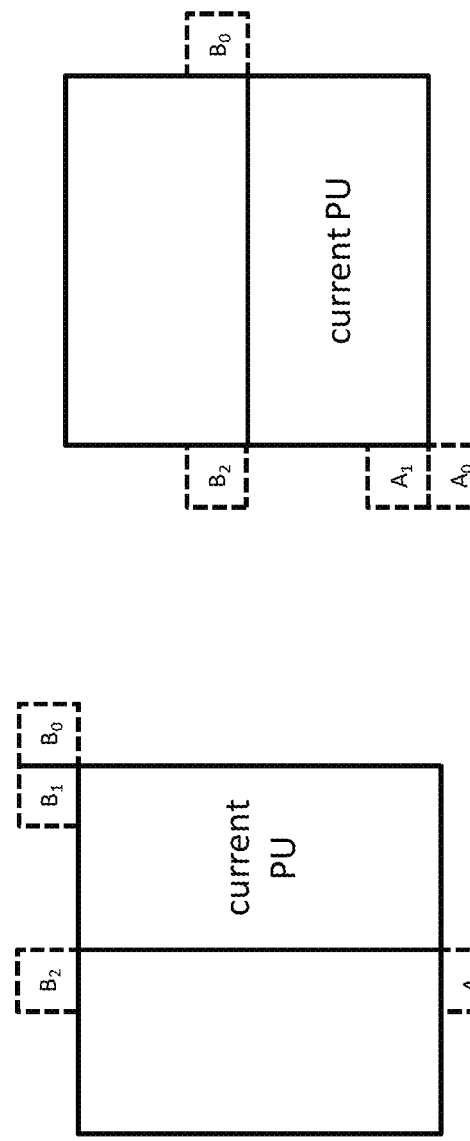
FIG. 4 shows example positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position B1 is not considered when the current PU is partitioned as 2N×N.

If current slice is B slice and the signalled collocated_from_l0_flag is equal to 0, ColPic is set equal to RefPicList1[collocated_ref_idx].

Otherwise (slice_type is equal to B and collocated_from_l0_flag is equal to 1, or slice_type is equal to P), ColPic is set equal to RefPicList0[collocated_ref_idx].

Here, collocated_ref_idx and collocated_from_l0_flag are two syntax elements which may be signalled in slice header.

Figure 6:
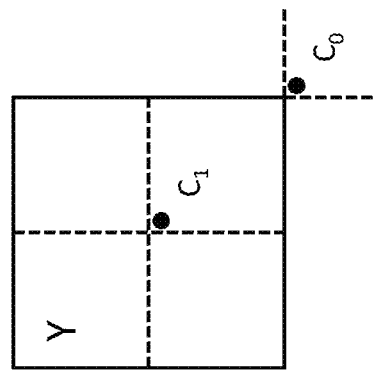
FIG. 6 shows examples of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU a.k.a., LCU, largest coding unit) row, position $C_1$ is used. Otherwise, position $C_0$ is used in the derivation of the temporal merge candidate.

Related syntax elements are described as follows:

7.3.6.1 General Slice Segment Header Syntax

| | Descriptor |
|---|---|
| slice_segment_header( ) { | |
|   first_slice_segment_in_pic_flag | u(1) |
|   ... | |
|   if( slice_type = = P \|\| slice_type = = B ) { | |
|     num_ref_idx_active_override_flag | u(1) |
|     if( num_ref_idx_active_override_flag ) { | |
|       num_ref_idx_l0_active_minus1 | ue(v) |
|       if( slice_type = = B ) | |
|       num_ref_idx_l1_active_minus1 | ue(v) |
|     } | |
|   ... | |
|   *if( slice_temporal_mvp_enabled_flag ) {* | |
|     *if( slice_type = = B )* | |
|     *collocated_from_l0_flag* | u(1) |
|     *if( ( collocated_from_l0_flag && num_ref_idx_l0_active_minus1 > 0 ) \|\|* | |
|     *( !collocated_from_l0_flag && num_ref_idx_l1_active_minus1 > 0 ) )* | |
|     *collocated_ref_idx* | ue(v) |
|   *}* | |
|   ... | |
|   byte_alignmennt( ) | |
| } | |

2.1.2.3 Temporal Candidates Derivation

Figure 5:
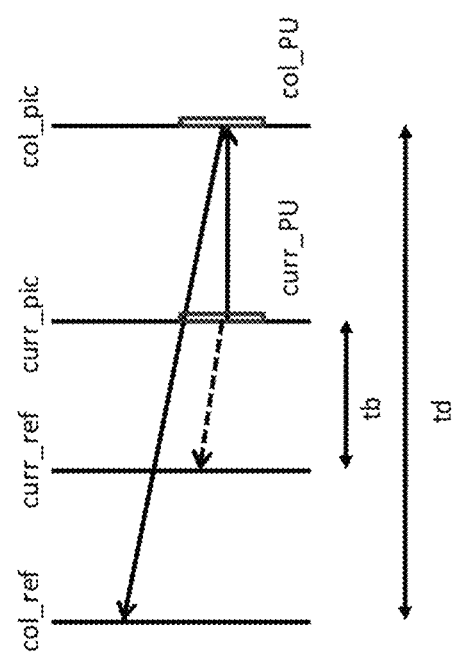
FIG. 5 is an illustration of motion vector scaling for temporal merge candidate.

In this step, only one candidate is added to the list. Particularly, in the derivation of this temporal merge candidate, a scaled motion vector is derived based on co-located PU in a co-located picture. FIG. 5 is an illustration of motion vector scaling for temporal merge candidate. The scaled motion vector for temporal merge candidate is obtained as illustrated by the dotted line in FIG. 5, which is scaled from the motion vector of the co-located PU using the picture order count (POC) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification [1]. For a B-slice, two motion vectors, one is for reference picture list 0 and the other is for reference picture list 1, are obtained and combined to make the bi-predictive merge candidate.

2.1.2.4 Co-Located Picture and Co-Located PU

When temporal motion vector prediction (TMVP) is enabled (e.g., slice_temporal_mvp_enabled_flag is equal to 1), the variable ColPic representing the col-located picture is derived as follows:

2.1.2.5 Derivation of MVs for the TMVP candidate

In some embodiments, the following steps are performed in order to derive the TMVP candidate:

1) set reference picture list X=0, target reference picture to be the reference picture with index equal to 0 (e.g., curr_ref) in list X. Invoke the derivation process for collocated motion vectors to get the motion vector (MV) for list X pointing to curr_ref.

2) if current slice is B slice, set reference picture list X=1, target reference picture to be the reference picture with index equal to 0 (e.g., curr_ref) in list X. Invoke the derivation process for collocated motion vectors to get the MV for list X pointing to curr_ref.

The derivation process for collocated motion vectors is described in the next sub-section.

2.1.2.5.1 Derivation Process for Collocated Motion Vectors

For the co-located block, it may be intra or inter coded with uni-prediction or bi-prediction. If it is intra coded, TMVP candidate is set to be unavailable.

If it is uni-prediction from list A, the motion vector of list A is scaled to the target reference picture list X.

If it is bi-prediction and the target reference picture list is X, the motion vector of list A is scaled to the target reference picture list X, and A is determined according to the following rules:

If none of reference pictures has a greater POC values compared to current picture, A is set equal to X.

Otherwise, A is set equal to collocated_from_l0_flag.

2.1.2.6 Additional Candidates Insertion

Figure 7:
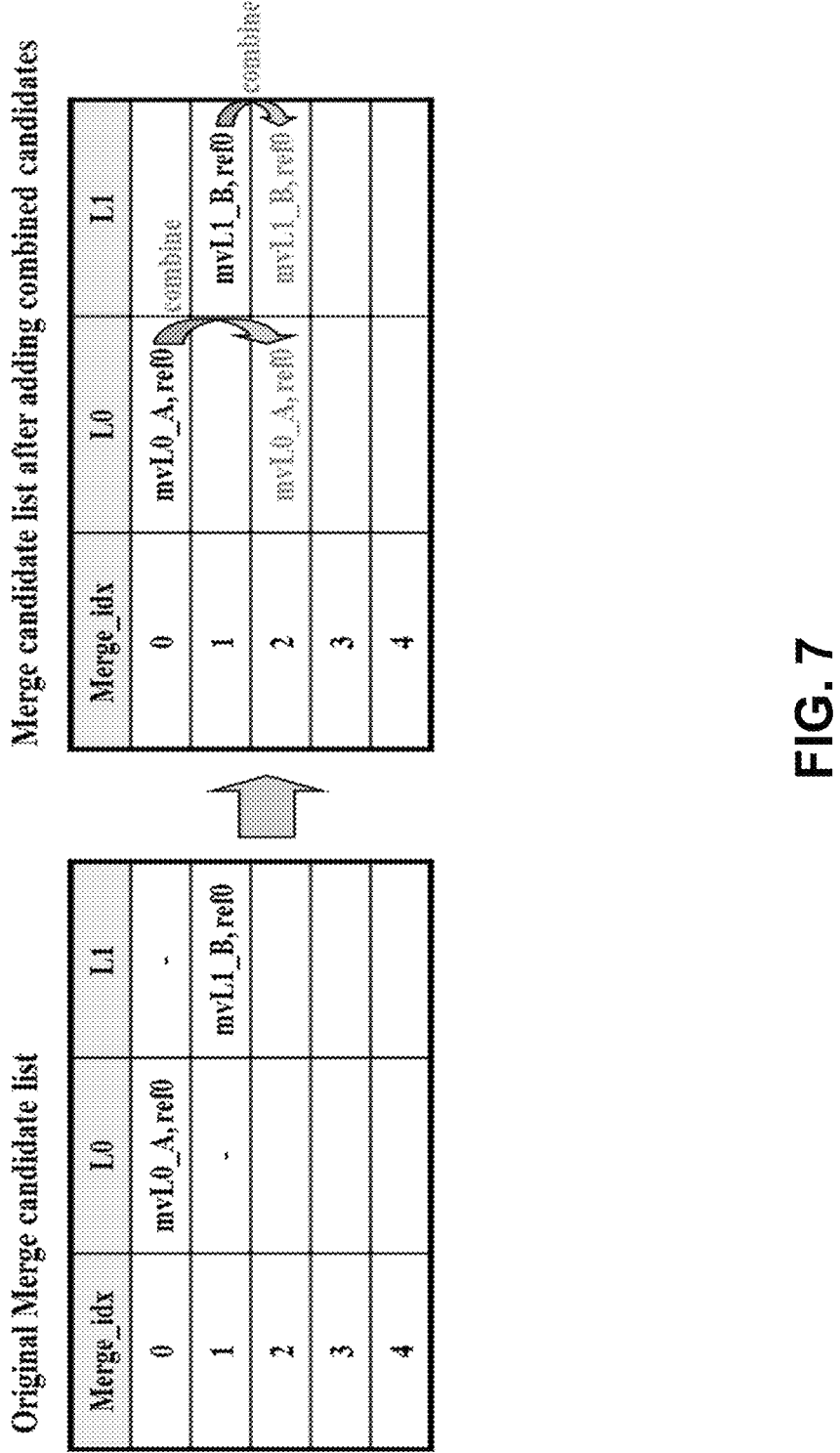
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. FIG. 7 shows an example of combined bi-predictive merge candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 Advanced Motion Vector Prediction (AMVP)

AMVP exploits spatial-temporal correlation of motion vector with neighboring PUs, which is used for explicit transmission of motion parameters. For each reference picture list, a motion vector candidate list is constructed by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
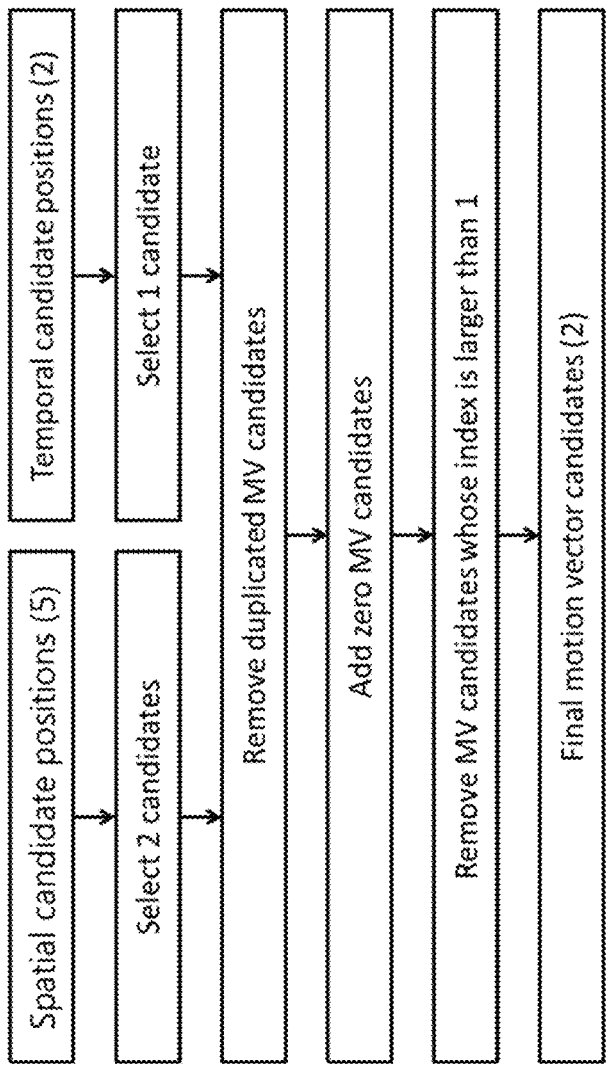
FIG. 8 shows an example derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
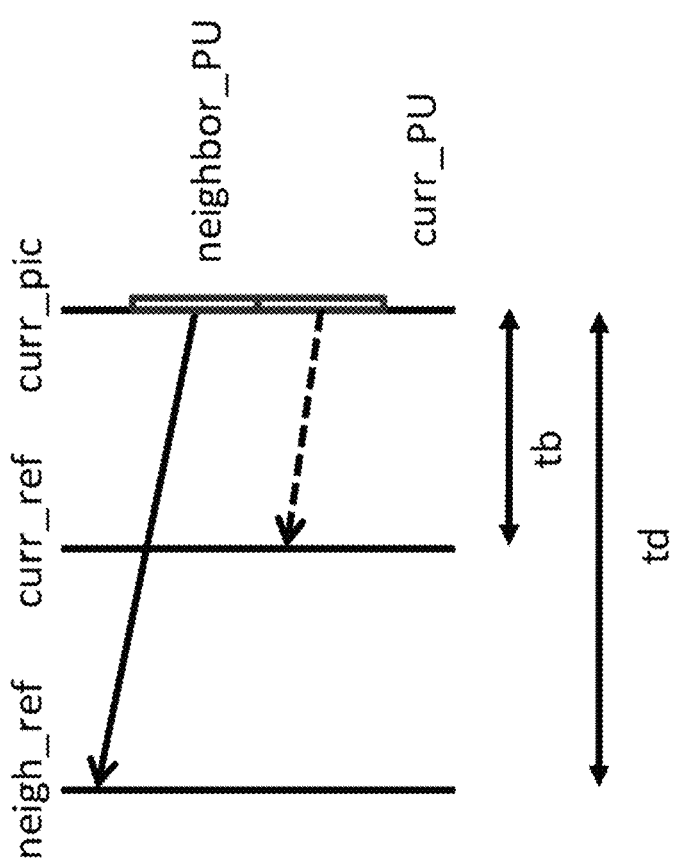
FIG. 9 is an illustration of motion vector scaling for spatial motion vector candidate.

In a spatial scaling process, the motion vector of the neighboring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, a.k.a., SbTMVP), affine prediction mode, Generalized Bi-Prediction (GBI), Decoder-side Motion Vector Refinement (DMVR) and Bi-directional Optical flow (BIO, a.k.a., BDOF).

There are two different merge list construction processes supported in VVC:
(1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
(2) Regular merge list: For inter-coded blocks, one merge list construction process is shared. Here, the spatial/ temporal merge candidates, HMVP, pairwise merge candidates and zero motion candidates may be inserted in order. Regular merge list size is signaled in slice header, and maximum value is 6. MMVD, TPM, CIIP rely on the regular merge list.

Similarly, there are three AMVP lists supported in VVC:
(1) Affine AMVP candidate list
(2) Regular AMVP candidate list 2.2.1 Coding Block Structure in VVC In VVC, a Quad-Tree/Binary Tree/Ternary-Tree (QT/BT/TT) structure is adopted to divide a picture into square or rectangle blocks.

Besides QT/BT/TT, separate tree (a.k.a., Dual coding tree) is also adopted in VVC for I-frames. With separate tree, the coding block structure are signaled separately for the luma and chroma components.

In addition, the CU is set equal to PU and TU, except for blocks coded with a couple of specific coding methods (such as intra sub-partition prediction wherein PU is equal to TU, but smaller than CU, and sub-block transform for inter-coded blocks wherein PU is equal to CU, but TU is smaller than PU).

2.2.2 MERGE for Whole Block 2.2.2.1 Merge List Construction of Translational Regular Merge Mode 2.2.2.1.1 History-Based Motion Vector Prediction (HMVP)

Different from the merge list design, in VVC, the history-based motion vector prediction (HMVP) method is employed.

Figure 10:
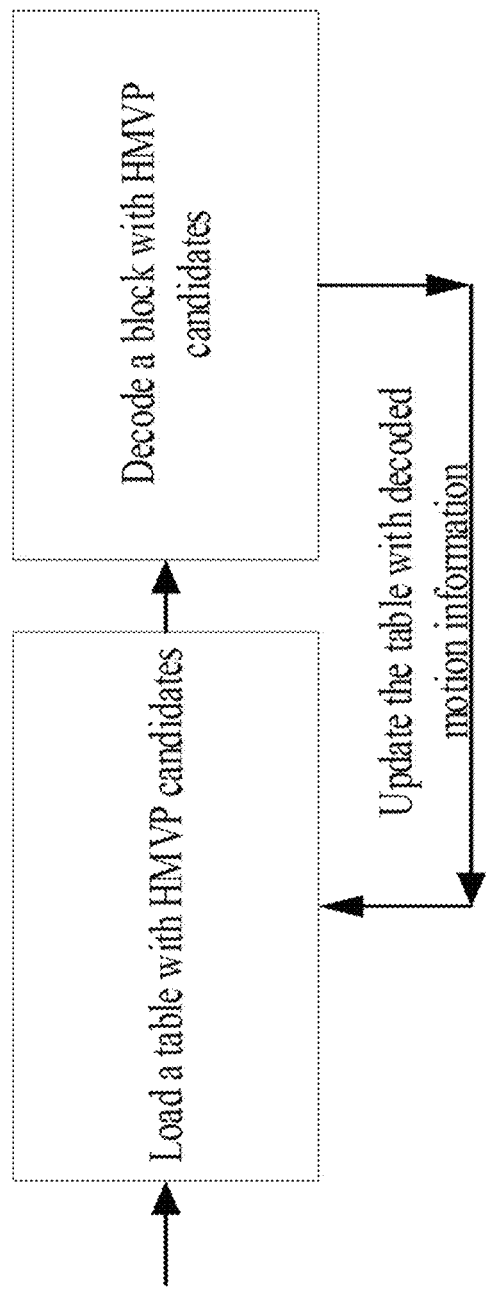
FIG. 10 shows examples of candidates position for affine merge mode.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 10.

2.2.2.1.2 Regular Merge List Construction Process

Figure 11:
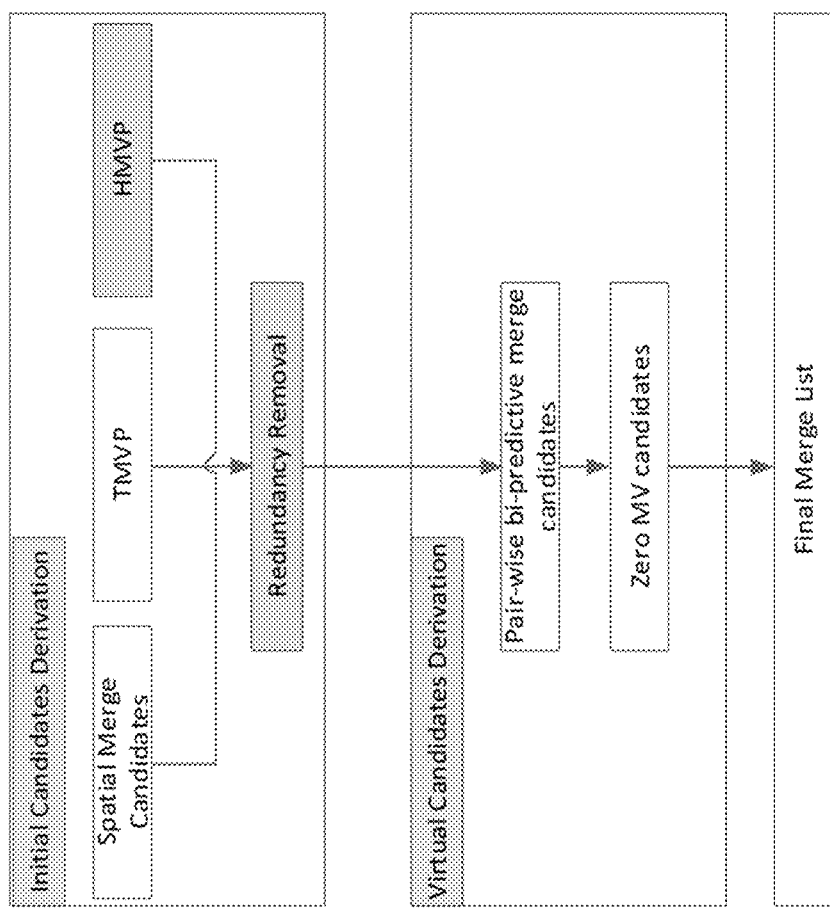
FIG. 11 shows a modified merge list construction process.

The construction of the regular merge list (for translational motion) can be summarized according to the following sequence of steps:
Step 1: Derivation of spatial candidates
Step 2: Insertion of HMVP candidates
Step 3: Insertion of pairwise average candidates
Step 4: default motion candidates HMVP candidates could be used in both AMVP and merge candidate list construction processes. FIG. 11 depicts The modified merge candidate list construction process (highlighted in blue). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.2.2.1.2.1 Pruning Processes

A candidate is only added to the list if the corresponding candidate used for redundancy check has not the same motion information. Such comparison process is called pruning process.

The pruning process among the spatial candidates is dependent on the usage of TPM for current block.

When current block is coded without TPM mode (e.g., regular merge, MMVD, CIIP), the HEVC pruning process (e.g., five pruning) for the spatial merge candidates is utilized.

2.2.3 Triangular Prediction Mode (TPM)

In VVC, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signalled to indicate whether the triangle partition mode is applied or not.

When this mode is used, a CU is split evenly into two triangle-shaped partitions, using either the diagonal split or the anti-diagonal split, as depicted in FIG. 11. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

Figure 12:
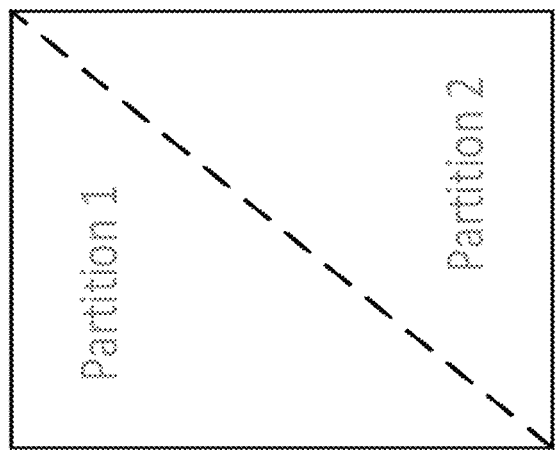
FIG. 12 shows an example of triangle partition based inter prediction.
Figure 12:
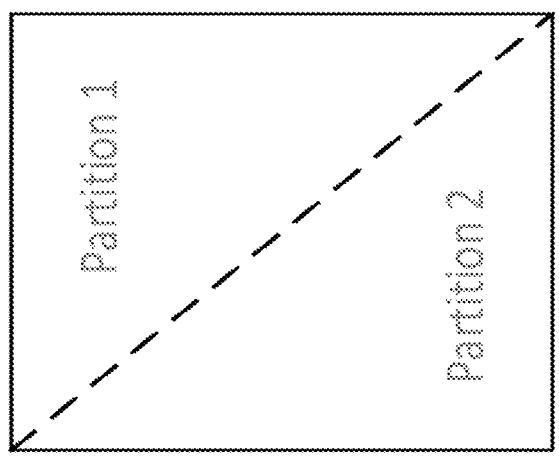

FIG. 12 shows an example of triangle partition based inter prediction.

If the CU-level flag indicates that the current CU is coded using the triangle partition mode, a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.2.3.1 Merge List Construction Process for TPM

Basically, the regular merge list construction process can be with some modifications are added. Specifically, the followings are applied:
  (1) How to do the pruning process is dependent on the usage of TPM for current block
    If the current block is not coded with TPM, the HEVC 5 pruning applied to spatial merge candidates is invoked
    Otherwise (if the current block is coded with TPM), full pruning is applied when adding a new spatial merge candidates. That is, B1 is compared to A1; B0 is compared to A1 and B1; A0 is compared to A1, B1, and B0; B2 is compared to A1, B1, A0, and B0.
  (2) The condition on whether to check of motion information from $B_2$ is dependent on the usage of TPM for current block:

If the current block is not coded with TPM, B2 is accessed and checked only when there are less than 4 spatial merge candidates before checking B2.

Otherwise (if the current block is coded with TPM), B2 is always accessed and checked regardless how many available spatial merge candidates before adding B2.

2.2.3.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: {7/8, 6/8, 4/8, 2/8, 1/8} and {7/8, 4/8, 1/8} are used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

Weighting factor group is selected based on the comparison of the motion vectors of two triangular prediction units. The $2^{nd}$ weighting factor group is used when any one of the following condition is true:

the reference pictures of the two triangular prediction units are different from each other.

absolute value of the difference of two motion vectors' horizontal values is larger than 16 pixels.

absolute value of the difference of two motion vectors' vertical values is larger than 16 pixels.

Figure 13:
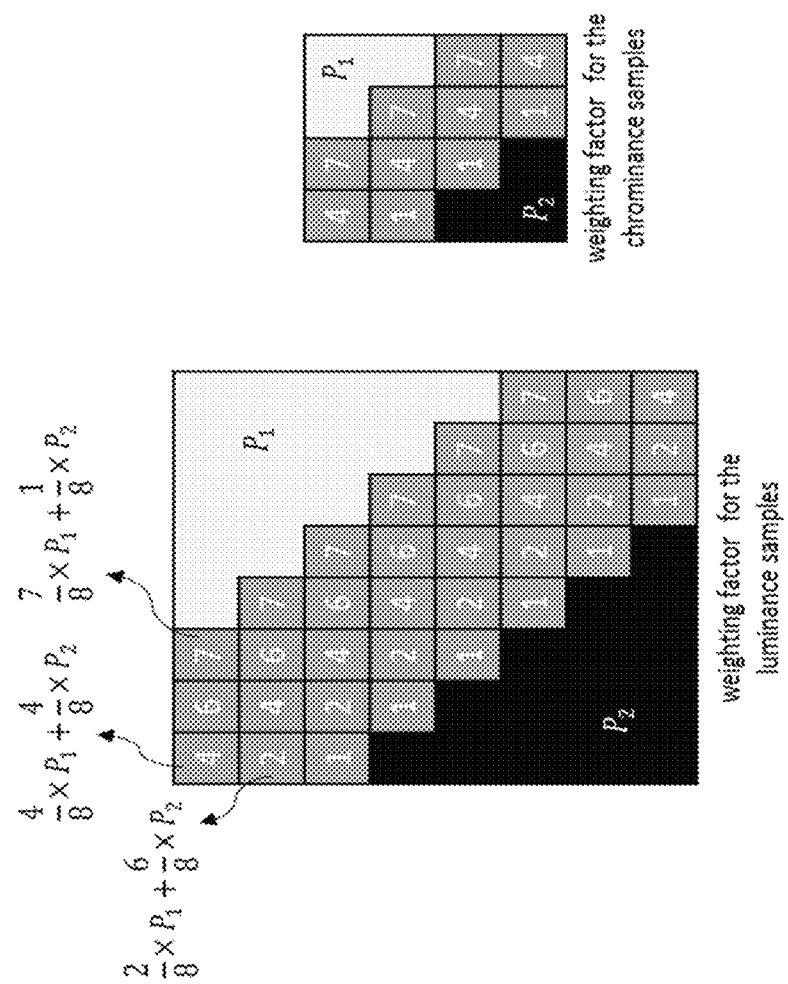
FIG. 13 shows an example of a coding unit (CU) applying the 1st weighting factor group.

Otherwise, the $1^{st}$ weighting factor group is used. An example is shown in FIG. 13.

2.2.3.3 Motion Vector Storage

Figure 14:
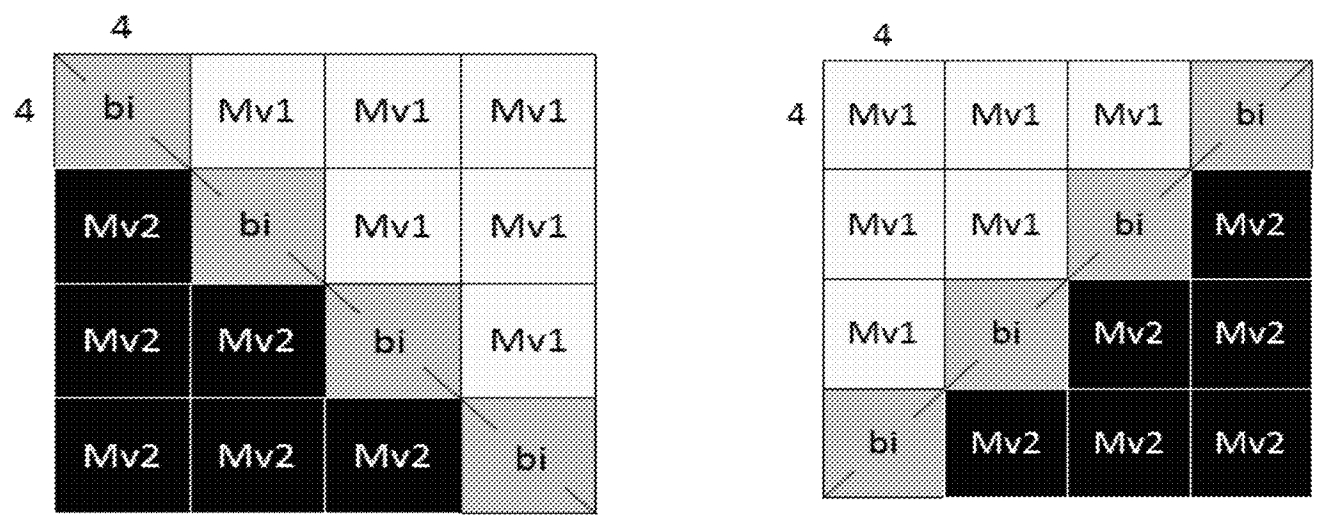

The motion vectors (Mv1 and Mv2 in FIG. 14) of the triangular prediction units are stored in 4×4 grids. For each 4×4 grid, either uni-prediction or bi-prediction motion vector is stored depending on the position of the 4×4 grid in the CU. As shown in FIG. 14, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

(1) In the case that Mv1 and Mv2 have motion vector from different directions (L0 or L1), Mv1 and Mv2 are simply combined to form the bi-prediction motion vector.

(2) In the case that both Mv1 and Mv2 are from the same L0 (or L1) direction,

If the reference picture of Mv2 is the same as a picture in the L1 (or L0) reference picture list, Mv2 is scaled to the picture. Mv1 and the scaled Mv2 are combined to form the bi-prediction motion vector.

If the reference picture of Mv1 is the same as a picture in the L1 (or L0) reference picture list, Mv1 is scaled to the picture. The scaled Mv1 and Mv2 are combined to form the bi-prediction motion vector.

Otherwise, only Mv1 is stored for the weighted area.

2.2.4 Merge with Motion Vector Difference (MMVD)

In some embodiments, ultimate motion vector expression (UMVE, also known as MMVD) is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

Figure 15:
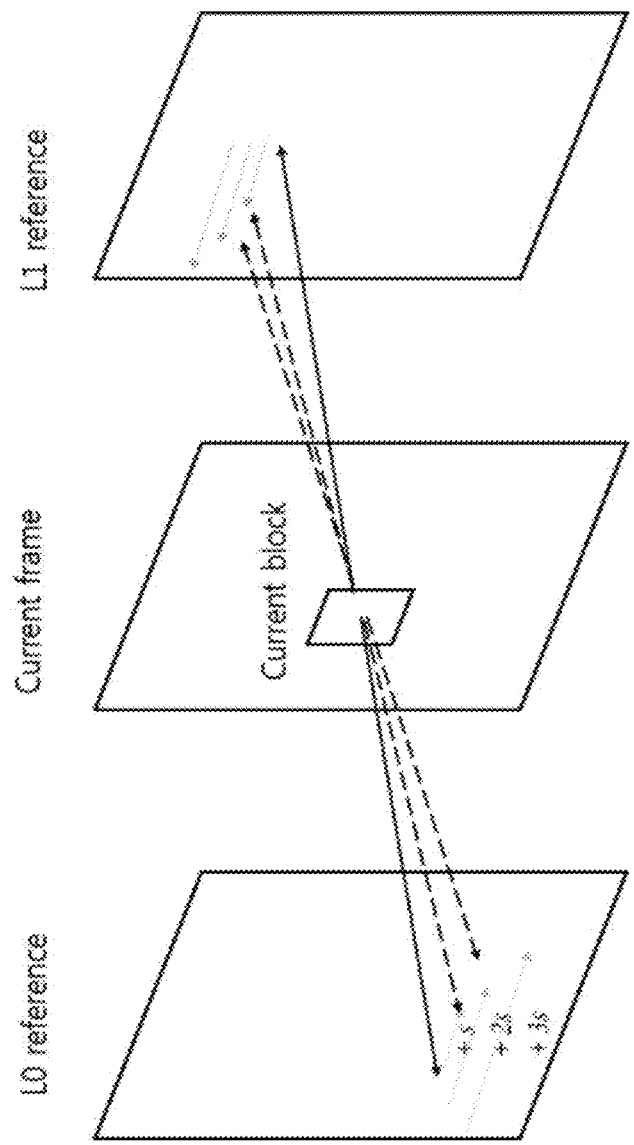
FIG. 15 is an example of the ultimate motion vector expression (UMVE) Search Process.

FIG. 15 is an example of the UMVE Search Process.

Figure 16:
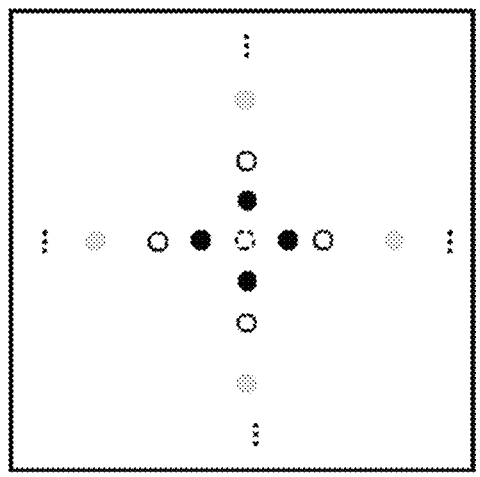
FIG. 16 shows an example of UMVE Search Point.
Figure 16:
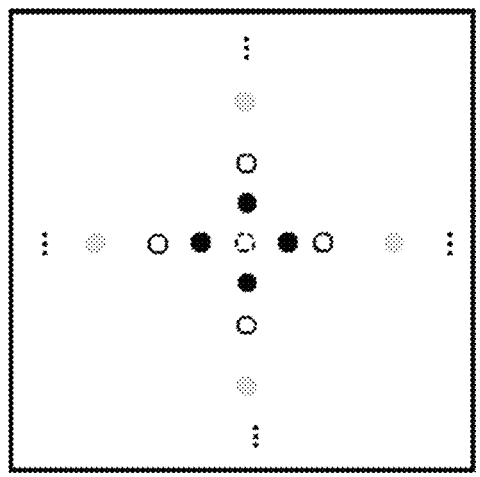

FIG. 16 shows an example of UMVE Search Point.

This technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate index (IDX) is not signaled.

Distance index is motion magnitude information. Distance index indicates the pre-defined distance from the starting point information. Pre-defined distance is as follows:

TABLE 2

| Distance IDX | | | | | | | |
|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is singnaled right after sending a skip flag or merge flag. If skip or merge flag is true, UMVE flag is parsed. If UMVE flage is equal to 1, UMVE syntaxes are parsed. But, if not 1, AFFINE flag is parsed. If AFFINE flag is equal to 1, that is AFFINE mode, But, if not 1, skip/merge index is parsed for VVC test model (VTM)'s skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.2.5 MERGE for Sub-Block-Based Technologies

In some embodiments, all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:
  a. ATMVP candidate (maybe available or unavailable);
  b. Affine merge lists (including Inherited Affine candidates; and Constructed Affine candidates);
  c. Padding as zero MV 4-parameter affine model

2.2.5.1 Advanced Temporal Motion Vector Predictor (ATMVP) (a.k.a., Sub-block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

In current design, ATMVP predicts the motion vectors of the sub-CUs within a CU in two steps which are described in the following two sub-sections 2.2.5.1.1 and 2.2.5.1.2 respectively.

2.2.5.1.1 Derivation of Initialized Motion Vector

Denote the initialized motion vector by tempMv. When block A1 is available and non-intra coded (e.g., coded with inter or IBC mode), the following is applied to derive the initialized motion vector.

If all of the following conditions are true, tempMv is set equal to the motion vector of block A1 from list 1, denoted by mvL1A$_1$:
  Reference picture index of list 1 is available (not equal to −1), and it has the same POC value as the collocated picture (e.g., DiffPicOrderCnt(ColPic, RefPicList[1][refIdxL1A$_1$]) is equal to 0),
  All reference pictures are with no larger POC compared to the current picture (e.g., DiffPicOrderCnt(aPic, currPic) is less than or equal to 0 for every picture aPic in every reference picture list of the current slice),
  Current slice is equal to B slice,
  collocated_from_l0_flag is equal to 0.
Otherwise if all of the following conditions are true, tempMv is set equal to the motion vector of block A1 from list 0, denoted by mvL0A$_1$:
  Reference picture index of list 0 is available (not equal to −1),
  it has the same POC value as the collocated picture (e.g., DiffPicOrderCnt(ColPic, RefPicList[0][refIdxL0A$_1$]) is equal to 0).
Otherwise, zero motion vector is used as the initialized MV.

A corresponding block (with center position of current block plus the rounded MV, clipped to be in certain ranges in necessary) is identified in the collocated picture signaled at the slice header with the initialized motion vector.

If the block is inter-coded, then go to the 2$^{nd}$ step. Otherwise, the ATMVP candidate is set to be NOT available.

2.2.5.1.2 Sub-CU Motion Derivation

The second step is to split the current CU into sub-CUs and obtain the motion information of each sub-CU from the block corresponding to each sub-CU in the collocated picture.

If the corresponding block for a sub-CU is coded with inter mode, the motion information is utilized to derive the final motion information of current sub-CU by invoking the derivation process for collocated MVs which is not different with the process for conventional TMVP process. Basically, if the corresponding block is predicted from the target list X for uni-prediction or bi-prediction, the motion vector is utilized; otherwise, if it is predicted from list Y (Y=1−X) for uni or bi-prediction and NoBackwardPredFlag is equal to 1, MV for list Y is utilized. Otherwise, no motion candidate could be found.

If the block in the collocated picture identified by the initialized MV and location of current sub-CU is intra or IBC coded, or no motion candidate could be found as described above, the following further apply:

Denote the motion vector used to fetch the motion field in the collocated picture R$_{col}$ as MV$_{col}$. To minimize the impact due to MV scaling, the MV in the spatial candidate list used to derive MV$_{col}$ is selected in the following way: if the reference picture of a candidate MV is the collocated picture, this MV is selected and used as MV$_{col}$ without any scaling. Otherwise, the MV having a reference picture closest to the collocated picture is selected to derive MV$_{col}$ with scaling.

The related decoding process for collocated motion vectors derivation process in some embodiments is described as follows:

8.5.2.12 Derivation Process for Collocated Motion Vectors

Inputs to this process are:
  a variable currCb specifying the current coding block,
  a variable colCb specifying the collocated coding block inside the collocated picture specified by ColPic,
  a luma location (xColCb, yColCb) specifying the top-left sample of the collocated luma coding block specified by colCb relative to the top-left luma sample of the collocated picture specified by ColPic,
  a reference index refIdxLX, with X being 0 or 1,
  a flag indicating a subblock temporal merging candidate sbFlag.
Outputs of this process are:
  the motion vector prediction mvLXCol in 1/16 fractional-sample accuracy,
  the availability flag availableFlagLXCol.
The variable currPic specifies the current picture.

The arrays predFlagL0Col[x][y], mvL0Col[x][y] and refIdxL0Col[x][y] are set equal to PredFlagL0[x][y], MvDmvrL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvDmvrL1 [x][y] and RefIdxL1[x][y], respectively, of the collocated picture specified by ColPic.

The variables mvLXCol and availableFlagLXCol are derived as follows:
  If colCb is coded in an intra or IBC prediction mode, both components of mvLXCol are set equal to 0 and availableFlagLXCol is set equal to 0.
  Otherwise, the motion vector mvCol, the reference index refIdxCol and the reference list identifier listCol are derived as follows:
    If sbFlag is equal to 0, availableFlagLXCol is set to 1 and the following applies:

If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.

Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.

Otherwise (predFlagL0Col[xColCb][yColCb] is equal to 1 and predFlagL1Col[xColCb][yColCb] is equal to 1), the following assignments are made:
If NoBackwardPredFlag is equal to 1, mvCol, refIdxCol and listCol are set equal to mvLXCol[xColCb][yColCb], refIdxLXCol[xColCb][yColCb] and LX, respectively.

Otherwise, mvCol, refIdxCol and listCol are set equal to mvLNCol[xColCb][yColCb], refIdxLNCol[xColCb][yColCb] and LN, respectively, with N being the value of collocated_from_l0_flag.

Otherwise (sbFlag is equal to 1), the following applies:
If PredFlagLXCol[xColCb][yColCb] is equal to 1, mvCol, refIdxCol, and listCol are set equal to mvLXCol[xColCb][yColCb], refIdxLXCol[xColCb][yColCb], and LX, respectively, availableFlagLXCol is set to 1.

Otherwise (PredFlagLXCol[xColCb][yColCb] is equal to 0), the following applies:
If DiffPicOrderCnt(aPic, currPic) is less than or equal to 0 for every picture aPic in every reference picture list of the current slice and PredFlagLYCol[xColCb][yColCb] is equal to 1, mvCol, refIdxCol, and listCol are set to mvLYCol[xColCb][yColCb], refIdxLYCol[xColCb][yColCb] and LY, respectively, with Y being equal to !X where X being the value of X this process is invoked for. availableFlagLXCol is set to 1.

Both the components of mvLXCol are set to 0 and availableFlagLXCol is set equal to 0.

When availableFlagLXCol is equal to TRUE, mvLXCol and availableFlagLXCol are derived as follows:
If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.

Otherwise, the variable availableFlagLXCol is set equal to 1, refPicList[listCol][refIdxCol] is set to be the picture with reference index refIdxCol in the reference picture list listCol of the slice containing coding block colCb in the collocated picture specified by ColPic, and the following applies:

$$\text{colPocDiff}=\text{DiffPicOrderCnt}(\text{ColPic}, \text{refPicList[listCol][refIdxCol]}) \quad (8\text{-}402)$$

$$\text{currPocDiff}=\text{DiffPicOrderCnt}(\text{currPic}, \text{RefPicList}[X][\text{refIdxLX}]) \quad (8\text{-}403)$$

The temporal motion buffer compression process for collocated motion vectors as specified in clause 8.5.2.15 is invoked with mvCol as input, and the modified mvCol as output.

If RefPicList[X][refIdxLX] is a long-term reference picture, or colPocDiff is equal to currPocDiff, mvLXCol is derived as follows:

$$\text{mvLXCol}=\text{mvCol} \quad (8\text{-}404)$$

Otherwise, mvLXCol is derived as a scaled version of the motion vector mvCol as follows:

$$tx=(16384+(\text{Abs}(td)>>1))/td \quad (8\text{-}405)$$

$$\text{distScaleFactor}=\text{Clip3}(-4096, 4095, (tb*tx+32)>>6) \quad (8\text{-}406)$$

$$\text{mvLXCol}=\text{Clip3}(-131072, 131071, (\text{distScaleFactor}*\text{mvCol}+128-(\text{distScaleFactor}*\text{mvCol}>=0))>>8)) \quad (8\text{-}407)$$

where td and tb are derived as follows:

$$td=\text{Clip3}(-128, 127, \text{colPocDiff}) \quad (8\text{-}408)$$

$$tb=\text{Clip3}(-128, 127, \text{currPocDiff}) \quad (8\text{-}409)$$

2.3 Intra Block Copy

Figure 17:
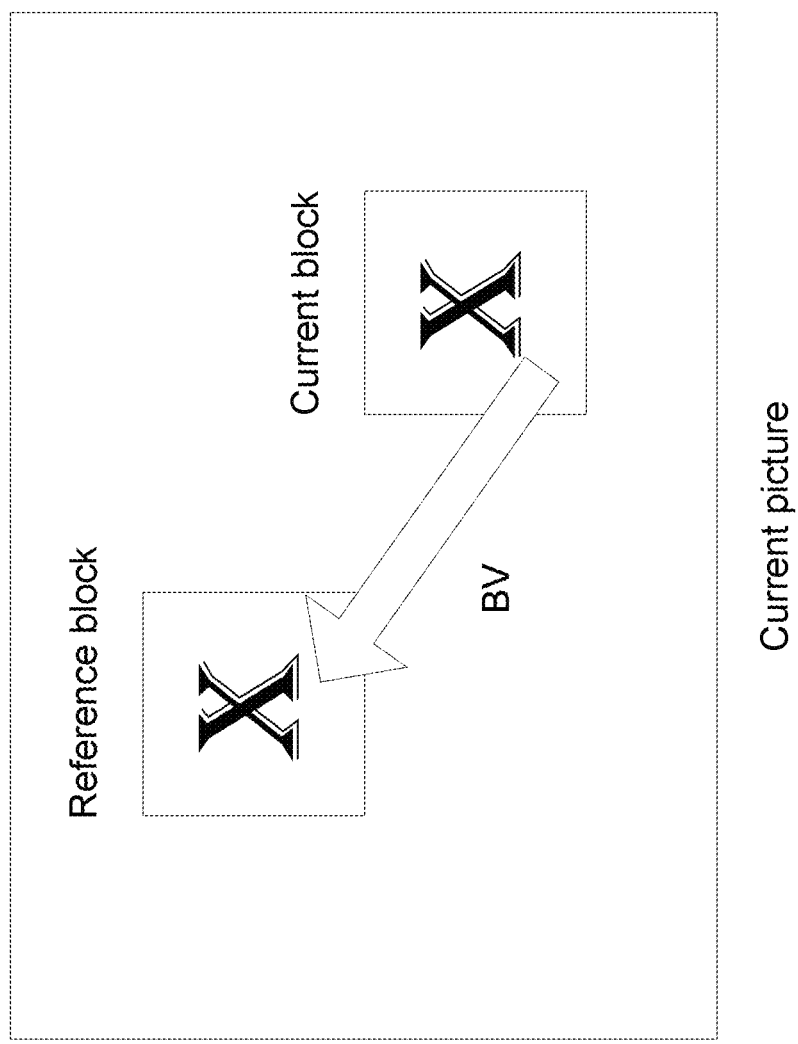
FIG. 17 is an illustration of operation of Intra block copy tool.

Intra block copy (IBC), a.k.a., current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 17, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g., in bitstream conformance. The other is to apply padding for those undefined pixel values. The following sub-sessions describe the solutions in detail.

2.3.1 Single BV list

In some embodiments, the BV predictors for merge mode and AMVP mode in IBC will share a common predictor list, which includes the following elements:
(1) two spatial neighboring positions (A1, B1 as in FIG. 2)
(2) five History-based Motion Vector Prediction (HMVP) entries
(3) Zero vectors by default The number of candidates in the list is controlled by a variable derived from the slice header. For merge mode, up to first 6 entries of this list will be used; for AMVP mode, the first 2 entries of this list will be used. And the list conforms with the shared merge list region requirement (shared the same list within the shared merging candidate list region (SMR)).

In addition to the above-mentioned BV predictor candidate list, the pruning operations between HMVP candidates and the existing merge candidates (A1, B$_1$) can be simplified. In the simplification there will be up to 2 pruning operations since it only compares the first HMVP candidate with spatial merge candidate(s).

For the IBC AMVP mode, the mv difference compared to a selected motion vector predictor (MVP) in the list is further transmitted. For the IBC merge mode, the selected MVP is directly used as the MV for current block.

2.3.2 Size Restriction of IBC

In the latest VVC and VTM5, it is proposed to explicitly use syntax constraint for disabling 128×128 IBC mode on top of the current bitstream constraint in the previous VTM and VVC versions, which makes presence of IBC flag dependent on CU size<128×128.

2.3.3 Shared Merge List for IBC

To reduce the decoder complexity and support parallel encoding, in some embodiments, the same merging candidate list is shared for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

More specifically, the following may apply:
- If the block has luma samples no larger than 32 (e.g., 4×8 or 8×4), and split to 2 4×4 child blocks, sharing merge lists between very small blocks (e.g., two adjacent 4×4 blocks) is used.
- If the block has luma samples larger than 32, however, after a split, at least one child block is smaller than the threshold (32), all child blocks of that split share the same merge list (e.g., 16×4 or 4×16 split ternary or 8×8 with quad split).

Such a restriction is only applied to IBC merge mode.

2.3.4 Syntax Tables 7.3.8.5 Coding Unit Syntax

|  | Descriptor |
|---|---|
| coding_unit( x0, y0, cbWidth, cbHeight, cqtDepth, treeType, modeType ) { | |
|   chType = treeType = = DUAL_TREE_CHROMA? 1: 0 | |
|   if( slice_type != I \|\| sps_ibc_enabled_flag \|\| sps_palette_enabled_flag) { | |
|     if( treeType != DUAL_TREE_CHROMA && | |
|       !( ( ( cbWidth = = 4 && cbHeight = = 4) \|\| modeType = = MODE_TYPE_INTRA ) | |
|       && !sps_ibc_enabled_flag ) ) | |
|     cu_skip_flag[ x0 ][ y0 ] | ae(v) |
|     if( cu_skip_flag[ x0 ][ y0 ] = =0 && slice_type != I | |
|       && !( cbWidth = = 4 && cbHeight = =4 ) && modeType = = MODE_TYPE_ALL ) | |
|     pred_mode_flag | ae(v) |
|     if( ( ( slice_type = = I && cu_skip_flag[ x0 ] [y0 ]= =0) \|\| | |
|       ( slice_type != I && ( CuPredMode[ chType ][ x0 ][ y0 ] !=MODE_INTRA \|\| | |
|         ( cbWidth = = 4 && cbHeight = = 4 && cu_skip_flag[ x0 ][ y0 ] = = 0 ) ) ) ) && | |
|       cbWidth <= 64 && cbHeight <= 64 && modeType != MODE_TYPE _INTER && | |
|       sps_ibc_enabled_flag && treeType != DUAL_TREE_CHROMA) | |
|     pred_mode_ibc_flag | ae(v) |
|     if( ( ( ( slice_type = = I \|\| ( cbWidth = = 4 && cbHeight = = 4) \| !sps_ibc_enabled_flag) && | |
|         CuPredMode[ x0 ][ y0 ] = = MODE_INTRA )\| \| | |
|       ( slice_type != I && !( cbWidth = = 4 && cbHeight = = 4 ) && !sps_ibc_enabled_flag | |
|       && CuPredMode[ x0 ][ y0 ] != MODE_INTRA ) ) && sps_palette_enabled_flag && | |
|       cbWidth <= 64 && cbHeight <= 64 && && cu_skip_flag[ x0 ][ y0 ] = = 0 && | |
|       modeType != MODE_INTER ) | |
|     pred_mode_plt_flag | ae(v) |
|   } | |
|   if( CuPredMode[ chType ][ x0 ][ y0 ] = = MODE_INTRA \|\| | |
|     CuPredMode[ chType ][ x0 ][ y0 ] = = MODE_PLT ){ | |
|     ... | |
|   } | |
| } else if( treeType != DUAL_TREE_CHROMA ) { /* MODE_INFER or MODE_IBC */ | |
|   if( cu_skip_flag[ x0 ][ y0 ] = = 0) | |
|   general_merge_flag[ x0 ] [y0 ] | ae(v) |
|   if( general_merge_flag[ x0 ][ y0 ]) { | |
|     merge_data( x0, y0, cbWidth, cbHeight, chType ) | |
|   } *else if ( CuPredMode[ chType ][x0 ][ y0 ] = = MODE_IBC ) {* | |
|   *mvd_coding( x0, y0, 0, 0 )* | |
|   *if( MaxNumIbcMergeCand > 1 )* | |
|     *mvp_l0_flag[ x0 ][ y0 ]* | *ae(v)* |
|   *if( sps_amvr_enabled_flag &&* | |
|     *( MvdL0[ x0 ][ y0 ][ 0 ] !=0 \|\| MvdL0[ x0 ][ y0 ][ 1 ] !=0 ) ) {* | |
|     *amvr_precision_idx[ x0 ][ y0 ]* | *ae(v)* |
|   *}* | |
|   } else { | |
|     ... | |
|   } | |

7.3.8.8 Motion Vector Difference Syntax

| | Descriptor |
|---|---|
| mvd_coding( x0, y0, refList ,cpIdx ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

2.4 Maximum Transform Block Size

The max luma transform size to be either 64 or 32 only is enabled with a flag at the SPS level. Max chroma transform size is derived from the chroma sampling ratio relative to the max luma transform size.

When the CU/coding block (CB) size is greater than the max luma transform size, a tiling of large CUs by smaller TUs may be invoked.

Denote the max luma transform size by MaxTbSizeY.

7.3.2.3 Sequence Parameter Set RBSP Syntax

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   ... | |
|   if( ChromaArrayType != 0 ) | |
|     sps_cclm_enabled_flag | u(1) |
|   if( sps_cclm_enabled_flag && chroma_format_idc = = 1 ) | |
|     sps_cclm_colocated_chroma_flag | u(1) |
| | Descriptor |
|---|---|
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
|   sps_sbt_enabled_flag | u(1) |
|   if( sps_sbt_enabled_flag ) | |
|     sps_sbt_max_size_64_flag | u(1) |
|   sps_affine_enabled_flag | u(1) |
|   if( sps_affine_enabled_flag ) { | |
|     sps_affine_type_flag | u(1) |
|     sps_affine_amvr_enabled_flag | u(1) |
|     sps_affine_prof_enabled_flag | u(1) |
|   } | |
| ... | |
|   rbsp_trailing_bits( ) | |
| } | | sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

When CtbSizeY is less than 64, the value of sps_max_luma_transform_size_64_flag shall be equal to 0.

The variables MinTbLog2SizeY, MaxTbLog2SizeY, MinTbSizeY, and MaxTbSizeY are derived as follows:

$$\text{MinTbLog2SizeY}=2 \tag{7-27}$$

$$\text{MaxTbLog2SizeY}=\text{sps\_max\_luma\_transform\_size\_64\_flag}?6:5 \tag{7-28}$$

$$\text{MinTbSizeY}=1<<\text{MinTbLog2SizeY} \tag{7-29}$$

$$\text{MaxTbSizeY}=1<<\text{MaxTbLog2SizeY} \tag{7-30}$$

sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$\text{MaxSbtSize}=\text{Min}(\text{MaxTbSizeY},\text{sps\_sbt\_max\_size\_64\_flag}?64:32) \tag{7-32}$$

2.4.1 Tools Dependent on Maximum Transform Block Size

The splitting of binary tree and ternary tree is dependent on MaxTbSizeY.

7.3.8.5 Coding Unit Syntax

| | Descriptor |
|---|---|
| coding_unit( x0, y0, cbWidth, cbHeight, cqtDepth, treeType, modeType ) { | |
|   chType = treeType = = DUAL_TREE_CHROMA? 1: 0 | |
|   if( slice_type != I \|\| sps_ibc_enabled_flag \|\| sps_palette_enabled_flag) { | |
|     if( treeType != DUAL_TREE_CHROMA && | |
|       !( ( ( cbWidth = = 4 && cbHeight = = 4 ) \|\| modeType = = MODE_TYPE_INTRA ) | |
|         && !sps_ibc_enabled_flag ) ) | |
|     if(single tree && | |
|       !( ( 4x4 \|\| INTRA Only) && !sps_IBC)) | |
|       cu_skip_flag[ x0 ][ y0 ] | ae(v) |
|     if( cu_skip_flag[ x0 ][ y0 ] = = 0 && slice_type != I | |
|       &&! ( cbWidth = = 4 && cbHeight = = 4 ) && modeType = = MODE_TYPE_ALL ) | |
|       pred_mode_flag | ae(v) |
|     if( ( ( slice_type = = I && cu_skip_flag[ x0 ][ y0 ] = =0 ) \|\| | |
|       ( slice_type != I && ( CuPredMode[ chType ][ x0 ][ y0 ] != MODE_INTRA \|\| | |
|         ( cbWidth = = 4 && cbHeight = = 4 && cu_skip_flag [ x0 ][ y0 ] = = 0 ) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|     pred_mode_ibc_flag | ae(v) |
|   if( ( ( ( slice_type = = I \|\| ( cbWidth = = 4 && cbHeight = = 4) \|\| sps_ibc_enabled_flag ) && | |
|     CuPredMode[ x0 ][ y0 ] = = MODE_INTRA ) \|\| | |

|  | Descriptor |
|---|---|
|    ( slice_type != I && !( cbWidth = = 4 && cbHeight = = 4) && !sps_ibc_enabled_flag<br>    && CuPredMode[ x0 ][ y0 ] != MODE_INTRA ) ) && sps_palette_enabled_flag &&<br>   cbWidth <= 64 && cbHeight <= 64 && && cu_skip_flag[ x0 ][ y0 ] = = 0 &&<br>   modeType != MODE_INTER )<br>    pred_mode_plt_flag | ae(v) |
| }<br>if( CuPredMode[ chType ][ x0 ][ y0 ] = = MODE_INTRA \|\|<br> CuPredMode[ chType ][ x0 ][ y0 ] = = MODE_PLT ) {<br> if( treeType = = SINGLE_TREE \|\| treeType = = DUAL_TREE_LUMA ) {<br>  if( pred_mode_plt_flag ) {<br>   if( treeType = = DUAL_TREE_LUMA )<br>    palette_coding( x0, y0, cbWidth, cbHeight, 0, 1 )<br>   else /* SINGLE_TREE */<br>    palette_coding( x0, y0, cbWidth, cbHeight, 0, 3 )<br>  }else {<br>   if( sps_bdpcm_enabled_flag &&<br>    cbWidth <= MaxTsSize && cbHeight <= MaxTsSize )<br>    intra_bdpcm_flag | ae(v) |
|    if( intra_bdpcm_flag )<br>    intra_bdpcm_dir_flag | ae(v) |
|    else {<br>    if( sps_mip_enabled_flag &&<br>     ( Abs( Log2( cbWidth ) − Log2( cbHeight ) ) <= 2) &&<br>     cbWidth <= MaxTbSizeY && cbHeight <= MaxTbSizeY )<br>    intra_mip_flag[ x0 ][ y0 ] | ae(v) |
|     if( intra_mip_flag[ x0 ][ y0 ] )<br>     intra_mip_mode[ x0 ][ y0 ] | ae(v) |
|     else {<br>     if( sps_mrl_enabled_flag && ( ( y0 % CtbSizeY ) > 0 ) )<br>      intra_luma_ref_idx[ x0 ][ y0 ] | ae(v) |
|      if ( sps_isp_enabled_flag && intraiuma_ref_idx[ x0 ][ y0 ] = = 0 &&<br>      ( cbWidth <= MaxTbSizeY && cbHeight <= MaxTbSizeY ) &&<br>      ( cbWidth * cbHeight > MinTbSizeY * MinTbSizeY ) )<br>      intra_subpartitions_mode_flag[ x0 ][ y0 ] | ae(v) |
|      if( intra_subpartitions_mode_flag[ x0 ][ y0 ] = = 1 )<br>      intra_subpartitions_split_flag[ x0 ][ y0 ] | ae(v) |
|      if( intra_luma_ref idx[ x0 ][ y0 ] = = 0 )<br>      intra_luma_mpm_flag[ x0 ][ y0 ] | ae(v) |
|      if( intra_luma_mpm_flag[ x0 ][ y0 ] ) {<br>      if( intra_luma_ref_idx[ x0 ][ y0 ] = = 0 )<br>       intra_luma_not_planar_flag[ x0 ][ y0 ] | ae(v) |
|       if( intra_luma_not_planar_flag[ x0 ][ y0 ] )<br>       intra_luma_mpm_idx[ x0 ][ y0 ] | ae(v) |
|      } else<br>      intra_luma_mpm_remainder[ x0 ][ y0 ] | ae(v) |
|      }<br>    }<br>   }<br>  }<br>  if( ( treeType = = SINGLE_TREE \|\| treeType = = DUAL_TREE_CHROMA ) &&<br>   ChromaArrayType != 0 ) {<br>   if ( pred_mode_plt_flag && treeType = = DUAL_TREE_CHROMA )<br>    palette_coding( x0, y0, cbWidth / Sub WidthC, cbHeight / SubHeightC, 1, 2 )<br>   else {<br>    if( CclmEnabled )<br>     cclm_mode_flag | ae(v) |
|     if( cclm_mode_flag )<br>     cclm_mode_idx | ae(v) |
|     else<br>     intra_chroma_pred_mode | ae(v) |
|    }<br>  }<br> } else if( treeType != DUAL_TREE_CHROMA ) { /* MODE_INTER or MODE_IBC */<br>...<br>}<br>if( CuPredMode[ chType ][ x0 ][ y0 ] != MODE_INTRA && !pred_mode_plt_flag &&<br> general_merge_flag[ x0 ][ y0 ] = = 0 )<br> cu_cbf | ae(v) |
| if( cu_cbf ) {<br> if( CuPredMode[ chType ][ x0 ][ y0 ] = = MODE_INTER && sps_sbt_enabled_flag<br>  && !ciip_flag[ x0 ][ y0 ] && !MergeTriangleFlag[ x0 ][ y0 ]) {<br>  if( cbWidth <= MaxSbtSize && cbHeight <= MaxSbtSize ) {<br>   allowSbtVerH = cbWidth >= 8<br>   allowSbtVerQ = cbWidth >= 16<br>   allowSbtHorH = cbHeight >= 8<br>   allowSbtHorQ = cbHeight >= 16<br>   if( allowSbtVerH \|\| allowSbtHorH \|\| allowSbtVerQ \|\| allowSbtHorQ ) |  |

| | Descriptor |
|---|---|
|       cu_sbt_flag | ae(v) |
|     } | |
|     if( cu_sbt_flag ) { | |
|       if( ( allowSbtVerH \|\| allowSbtHorH ) && ( allowSbtVerQ \|\| allowSbtHorQ ) ) | |
|         cu_sbt_quad_flag | ae(v) |
|       if( ( cu_sbt_quad_flag && allowSbtVerQ && allowSbtHorQ ) \|\| | |
|         ( !cu_sbt_quad_flag && allowSbtVerH && allowSbtHorH ) ) | |
|         cu_sbt_horizontal_flag | ae(v) |
|       cu_sbt_pos_flag | ae(v) |
|     } | |
|   } | |
|   LfnstDcOnly = 1 | |
|   LfnstZeroOutSigCoeffFlag = 1 | |
|   transform_tree( x0, y0, cbWidth, cbHeight, treeType ) | |
|   lfnstWidth = ( treeType = = DUAL_TREE_CHROMA ) ? cbWidth / Sub WidthC : cbWidth | |
|   lfnstHeight = ( treeType = = DUAL_TREE_CHROMA ) ? cbHeight / SubHeightC : cbHeight | |
|   if( Min( lfnstWidth, lfnstHeight ) >= 4 && sps_lfnst_enabled_flag = = 1 && | |
|     CuPredMode[ chType ][ x0 ][ y0 ] = = MODE_INTRA && | |
|     IntraSubPartitionsSplitType = = ISP_NO_SPLIT && | |
|     ( !intra_mip_flag[ x0 ][ y0 ] \|\| Min( lfnstWidth, lfnstHeight ) >= 16) && | |
|     tu_mts_idx[ x0 ][ y0 ] = = 0 && Max( cbWidth, cbHeight) <= MaxTbSizeY) { | |
|     if( LfnstDcOnly = = 0 && LfnstZeroOutSigCoeffFlag = = 1 ) | |
|       lfnst_idx[ x0 ][ y0 ] | ae(v) |
|   } | |
| } | |

2.4.2 Decoding Process of Intra and Inter Coded Blocks

When current intra coded CU's size is greater than the maximum transform block size, the CU is recursively split to smaller blocks (PUs) until both width and height are no greater than the maximum transform block size. All the PUs share the same intra prediction modes, but reference samples for intra prediction are different. Meanwhile, TU is set equal to PU. Note that current block shall not be coded with the Intra Sub-Partition (ISP) mode.

When current inter coded CU' size is greater than the maximum transform block size, the CU is recursively split to smaller blocks (TUs) until both width and height are no greater than the maximum transform block size. All the TUs share the same motion information, but reference samples for intra prediction are different.

8.4.5 Decoding Process for Intra Blocks 8.4.5.1 General Decoding Process for Intra Blocks Inputs to this process are:
- a sample location (xTb0, yTb0) specifying the top-left sample of the current transform block relative to the top-left sample of the current picture,
- a variable nTbW specifying the width of the current transform block,
- a variable nTbH specifying the height of the current transform block,
- a variable predModeIntra specifying the intra prediction mode,
- a variable cIdx specifying the colour component of the current block.

Output of this process is a modified reconstructed picture before in-loop filtering.

The maximum transform block width maxTbWidth and height maxTbHeight are derived as follows:

$$\text{maxTbWidth} = (\text{cIdx} == 0)?\text{MaxTbSizeY}:\text{MaxTbSizeY}/\text{SubWidthC} \quad (8\text{-}41)$$

$$\text{maxTbHeight} = (\text{cIdx} == 0)?\text{MaxTbSizeY}:\text{MaxTbSizeY}/\text{SubHeightC} \quad (8\text{-}42)$$

The luma sample location is derived as follows:

$$(\text{xTbY}, \text{yTbY}) = (\text{cIdx} == 0)?(\text{xTb0}, \text{yTb0}): (\text{xTb0}*\text{SubWidthC}, \text{yTb0}*\text{SubHeightC}) \quad (8\text{-}43)$$

Depending on maxTbSize, the following applies:

If IntraSubPartitionsSplitType is equal to ISP_NO_SPLIT and nTbW is greater than maxTbWidth or nTbH is greater than maxTbHeight, the following ordered steps apply.

1. The variables newTbW and newTbH are derived as follows:

$$\text{newTbW} = (\text{nTbW} > \text{maxTbWidth})?(\text{nTbW}/2):\text{nTbW} \quad (8\text{-}44)$$

$$\text{newTbH} = (\text{nTbH} > \text{maxTbHeight})?(\text{nTbH}/2):\text{nTbH} \quad (8\text{-}45)$$

2. The general decoding process for intra blocks as specified in this clause is invoked with the location (xTb0, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.

3. If nTbW is greater than maxTbWidth, the general decoding process for intra blocks as specified in this clause is invoked with the location (xTb0, yTb0) set equal to (xTb0+newTbW, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.

4. If nTbH is greater than maxTbHeight, the general decoding process for intra blocks as specified in this clause is invoked with the location (xTb0, yTb0) set equal to (xTb0, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.

5. If nTbW is greater than maxTbWidth and nTbH is greater than maxTbHeight, the general decoding process for intra blocks as specified in this clause is invoked with the location (xTb0, yTb0) set equal to (xTb0+newTbW, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.

Otherwise, the following ordered steps apply (normal intra prediction process):

8.5.8 Decoding Process for the Residual Signal of Coding Blocks Coded in Inter Prediction Mode Inputs to this process are:
a sample location (xTb0, yTb0) specifying the top-left sample of the current transform block relative to the top-left sample of the current picture,
a variable nTbW specifying the width of the current transform block,
a variable nTbH specifying the height of the current transform block,
a variable cIdx specifying the colour component of the current block.

Output of this process is an (nTbW)×(nTbH) array resSamples.

The maximum transform block width maxTbWidth and height maxTbHeight are derived as follows:

maxTbWidth=(cIdx==0)?MaxTbSizeY:MaxTbSizeY/SubWidthC (8-883)

maxTbHeight=(cIdx==0)?MaxTbSizeY:MaxTbSizeY/SubHeightC (8-884)

The luma sample location is derived as follows:

(xTbY, yTbY)=(cIdx==0)?(xTb0, yTb0):(xTb0*SubWidthC, yTb0*SubHeightC) (8-885)

Depending on maxTbSize, the following applies:
If nTbW is greater than maxTbWidth or nTbH is greater than maxTbHeight, the following ordered steps apply.
1. The variables newTbW and newTbH are derived as follows:

newTbW=(nTbW>maxTbWidth)?(nTbW/2):nTbW (8-886)

newTbH=(nTbH>maxTbHeight)?(nTbH/2):nTbH (8-887)

2. The decoding process for the residual signal of coding units coded in inter prediction mode as specified in this clause is invoked with the location (xTb0, yTb0), the transform block width nTbW set equal to newTbW and the height nTbH set equal to newTbH, and the variable cIdx as inputs, and the output is a modified reconstructed picture before in-loop filtering.
3. When nTbW is greater than maxTbWidth, the decoding process for the residual signal of coding units coded in inter prediction mode as specified in this clause is invoked with the location (xTb0, yTb0) set equal to (xTb0+newTbW, yTb0), the transform block width nTbW set equal to newTbW and the height nTbH set equal to newTbH, and the variable cIdx as inputs, and the output is a modified reconstructed picture.
4. When nTbH is greater than maxTbHeight, the decoding process for the residual signal of coding units coded in inter prediction mode as specified in this clause is invoked with the location (xTb0, yTb0) set equal to (xTb0, yTb0+newTbH), the transform block width nTbW set equal to newTbW and the height nTbH set equal to newTbH, and the variable cIdx as inputs, and the output is a modified reconstructed picture before in-loop filtering.
5. When nTbW is greater than maxTbWidth and nTbH is greater than maxTbHeight, the decoding process for the residual signal of coding units coded in inter prediction mode as specified in this clause is invoked with the location (xTb0, yTb0) set equal to (xTb0+newTbW, yTb0+newTbH), the transform block width nTbW set equal to newTbW and height nTbH set equal to newTbH, and the variable cIdx as inputs, and the output is a modified reconstructed picture before in-loop filtering.

Otherwise, if cu_sbt_flag is equal to 1, the following applies:
The variables sbtMinNumFourths, wPartIdx and hPartIdx are derived as follows:

sbtMinNumFourths=cu_sbt_quad_flag?1:2 (8-888)

wPartIdx=cu_sbt_horizontal_flag?4:sbtMinNumFourths (8-889)

hPartIdx=!cu_sbt_horizontal_flag?4:sbtMinNumFourths (8-890)

The variables xPartIdx and yPartIdx are derived as follows:
If cu_sbt_pos_flag is equal to 0, xPartIdx and yPartIdx are set equal to 0.
Otherwise (cu_sbt_pos_flag is equal to 1), the variables xPartIdx and yPartIdx are derived as follows:

xPartIdx=cu_sbt_horizontal_flag?0:(4−sbtMinNumFourths) (8-891)

yPartIdx=!cu_sbt_horizontal_flag?0:(4−sbtMinNumFourths) (8-892)

The variables xTbYSub, yTbYSub, xTb0Sub, yTb0Sub, nTbWSub and nTbHSub are derived as follows:

xTbYSub=xTbY+((nTbW*((cIdx==0)?1:SubWidthC)*xPartIdx/4) (8-893)

yTbYSub=yTbY+((nTbH*((cIdx==0)?1:SubHeightC)*yPartIdx/4) (8-894)

xTb0Sub=xTb0+(nTbW*xPartIdx/4) (8-895)

yTb0Sub=yTb0+(nTbH*yPartIdx/4) (8-896)

nTbWSub=nTbW*wPartIdx/4 (8-897)

nTbHSub=nTbH*hPartIdx/4 (8-898)

The scaling and transformation process as specified in clause 8.7.2 is invoked with the luma location (xTbYSub, yTbYSub), the variable cIdx, nTbWSub and nTbHSub as inputs, and the output is an (nTbWSub)×(nTbHSub) array resSamplesTb.

The residual samples resSamples[x][y] with x=0 . . . nTbW−1, y=0 . . . nTbH−1 are set equal to 0.

The residual samples resSamples[x][y] with x=xTb0Sub . . . xTb0Sub+nTbWSub−1, y=yTb0Sub . . . yTb0Sub+nTbHSub−1 are derived as follows:

resSamples[x][y]=resSamplesTb[x−xTb0Sub][y−yTb0Sub]  (8-899)

Otherwise, the scaling and transformation process as specified in clause 8.7.2 is invoked with the luma location (xTbY, yTbY), the variable cIdx, the transform width nTbW and the transform height nTbH as inputs, and the output is an (nTbW)×(nTbH) array resSamples.

2.5 Low-Frequency Non-Separable Transform (LFNST) (a.k.a., Reduced Secondary Transform (RST)/Non-Separable Secondary Transform (NSST))

Figure 18:
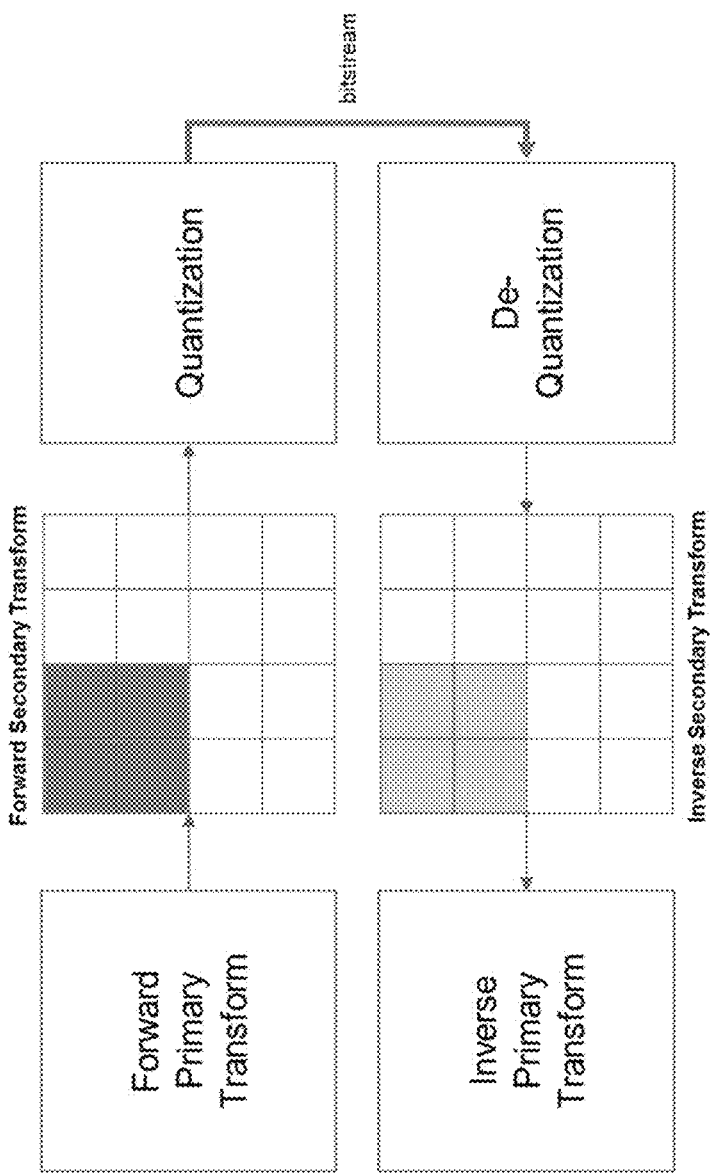
FIG. 18 shows an example of secondary transform in Joint Exploration Model (JEM).

In JEM, secondary transform is applied between forward primary transform and quantization (at encoder) and between de-quantization and inverse primary transform (at decoder side). As shown in FIG. 18, 4×4 (or 8×8) secondary transform is performed depends on block size. For example, 4×4 secondary transform is applied for small blocks (e.g., min (width, height)<8) and 8×8 secondary transform is applied for larger blocks (e.g., min (width, height)>4) per 8×8 block.

For the secondary transforms, non-separable transforms are applied, therefore, it is also named as Non-Separable Secondary Transform (NSST). There are totally 35 transform sets and 3 non-separable transform matrices (kernels, each one with 16×16 matrix) per transform set are used.

The Reduced Secondary Transform (RST, also known as low frequency non-separable transform, LFNST) was introduced and 4 transform sets (instead of 35 transform sets) mapping introduced according to intra prediction direction. In this contribution, 16×48 and 16×16 matrices are employed for 8×8 and 4×4 blocks, respectively. For notational convenience, 16×48 transform is denoted as RST8×8 and the 16×16 one as RST4×4. Such a method was recently adopted by VVC.

Figure 19:
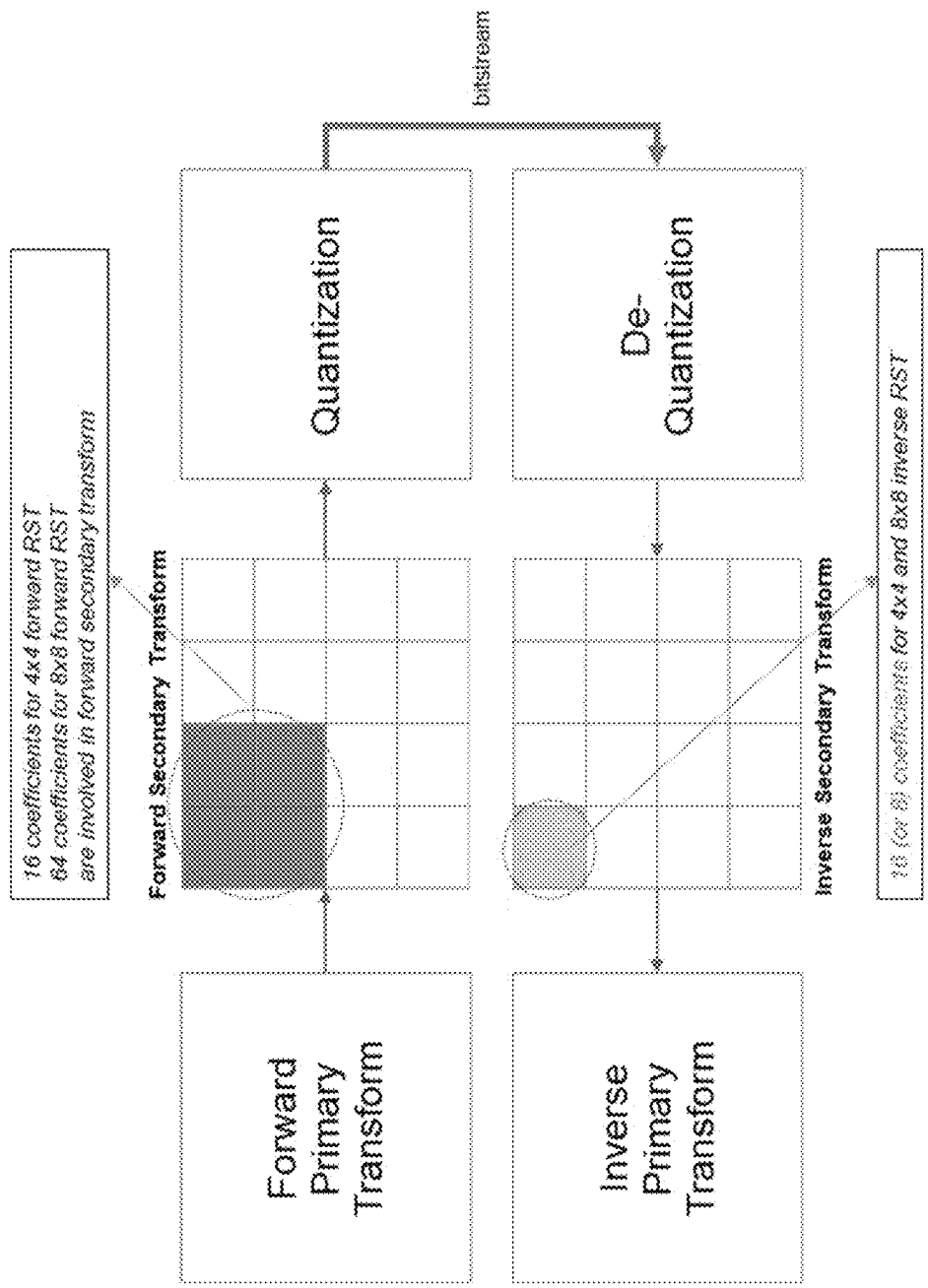
FIG. 19 shows an example of Reduced Secondary Transform (RST).

FIG. 19 shows an example of Reduced Secondary Transform (RST).

Secondary forward and inverse transforms are a separate process step from that of primary transforms.

For encoder, the primary forward transform is performed first, then followed by secondary forward transform and quantization, and Context-adaptive binary arithmetic coding (CABAC) bit encoding. For decoder, CABAC bit decoding and inverse quantization, then Secondary inverse transform is performed first, then followed by primary inverse transform. RST applies only to intra coded TUs.

3. Example Technical Problems Solved by Technical Solutions Disclosed Herein The current VVC design has the following problems in terms of IBC mode and transform design:
(1) The signaling of IBC mode flag is dependent on block size restriction. However, the IBC skip mode flag is not which makes the worst case unchanged (e.g., a large block, such as N×128 or 128×N, could still choose the IBC mode).
(2) It is assumed that the transform block size is always equal to 64×64 in current VVC and transform block size is always set to the coding block size. How to handle the case that IBC block size is greater than the transform block size is unknown.
(3) IBC uses the un-filtered constructed samples in the same video unit (e.g., slice). However, the filtered samples (e.g., via deblocking filter/sample adaptive offset (SAO)/adaptive loop filter (ALF)) may have smaller distortion compared to unfiltered ones. Using filtered samples may bring additional coding gains.
(4) Context modeling of LFNST matrix is dependent on the primary transform and partition type (single or dual tree). However, from our analysis, there is no clear dependency that the selected RST matrix has correlation with the primary transform.

4. Examples of Techniques and Embodiments

In this disclosure, intra block copy (IBC) may not be limited to the current IBC technology, but may be interpreted as the technology that using the reference samples within the current slice/tile/brick/subpicture/picture/other video unit (e.g., CTU row) excluding the conventional intra prediction methods. In one example, the reference samples are those reconstructed samples wherein in-loop filtering processes (e.g., deblocking filter, SAO, ALF) are not invoked.

A virtual pipeline data unit (VPDU) size may be denoted by vSizeX*vSizeY. In one example, let vSizeX=vSizeY=min(ctbSizeY, 64) wherein ctbSizeY is the width/height of a coding tree block (CTB). A VPDU is a vSize*vSize block with top-left position being (m*vSize, n*vSize) relative to the top-left of a picture wherein m, n are integers. Alternatively, vSizeX/vSizeY is a fixed number such as 64.

The detailed embodiments below should be considered as examples to explain general concepts. These embodiments should not be interpreted in a narrow way. Furthermore, these embodiments can be combined in any manner.

Regarding Signaling and Usage of IBC

Assume the current block size is denoted by $W_{curr} \times H_{curr}$, the max allowed IBC block size by $W_{IBCMax} \times H_{IBCMax}$.
1. An IBC coded block may be split into multiple TBs/TUs without signaling of splitting information. Denote the current IBC code block size by $W_{curr} \times H_{curr}$.
   a. In one example, $W_{curr}$ is greater than a first threshold and/or $H_{curr}$ is greater than a second threshold, the splitting may be invoked. Therefore, the transform block (TB) size is smaller than the current block size.
      i. In one example, the first and/or second threshold is the maximum transform size, denoted by MaxTbSizeY.
   b. In one example, recursively splitting may be invoked until either the width or height of a TU/TB is no greater than the thresholds.
      i. In one example, the recursively splitting may be the same as that utilized for inter coded residual blocks, e.g., each time divide the width by half if width is greater than MaxTbSizeY and divide the height by half if height is greater than MaxTbSizeY.
      ii. Alternatively, recursively splitting may be invoked until both the split width and height of a TU/TB are no greater than the thresholds, respectively.
   c. Alternatively, furthermore, all or some of the multiple TBs/TUs may share the same motion information (e.g., BVs).

2. Whether to enable or disable IBC may depend on the maximum transform size (e.g., MaxTbSizeY in the specification).
   a. In one example, when current luma block dimensions (width and/or height) or the corresponding luma block dimensions (width and/or height) (when current block is a chroma block) is greater than the maximum transform size in luma samples, IBC may be disabled.
      i. In one example, when both block width and height is greater than the maximum transform size in luma samples, IBC may be disabled.
      ii. In one example, when either block width or height is greater than the maximum transform size in luma samples, IBC may be disabled.
   b. In one example, whether to and/or how to signal the indication of usage of IBC may depend on the block dimensions (width and/or height) and/or maximum transform size.
      i. In one example, the indication of usage of IBC may include the IBC skip flag (e.g., cu_skip_flag) in an I tile/slice/brick/subpicture.
         1) In one example, the cu_skip_flag may not be signaled when $W_{curr}$ is greater than MaxTbSizeY and/or $H_{curr}$ is greater than MaxTbSizeY.
         2) Alternatively, the cu_skip_flag may be signaled when $W_{curr}$ is no greater than MaxTbSizeY and/or $H_{curr}$ is no greater than MaxTbSizeY.
         3) In one example, the cu_skip_flag may be signaled when $W_{curr}$ is greater than MaxTbSizeY and/or $H_{curr}$ is greater than MaxTbSizeY but it shall be equal to 0 in a conformance bit-stream.
         4) For example, furthermore, the above method may be invoked when current tile/slice/brick/subpicture is an I tile/slice/brick/subpicture.
      ii. In one example, the indication of usage of IBC may include the IBC mode flag (e.g., pred_mode_ibc_flag).
         1) In one example, the pred_mode_ibc_flag may not be signaled when $W_{curr}$ is greater than MaxTbSizeY and/or $H_{curr}$ is greater than MaxTbSizeY.
         2) Alternatively, the pred_mode_ibc_flag may be signaled when $W_{curr}$ is no greater than MaxTbSizeY and/or $H_{curr}$ is no greater than MaxTbSizeY.
         In one example, the pred_mode_ibc_flag may be signaled when $W_{curr}$ is greater than MaxTbSizeY and/or $H_{curr}$ is greater than MaxTbSizeY, but it shall be equal to 0 in a conformance bit-stream.
      iii. In one example, when certain zero-forcing conditions are satisfied, the residual block of an IBC coded block may be forced to be all zero.
         1) In one example, when $W_{curr}$ is greater than MaxTbSizeY and/or $H_{curr}$ is greater than MaxTbSizeY, the residual block of an IBC coded block may be forced to be all zero.
         2) In one example, when W curr is greater than a first threshold (e.g., 64/vSizeX) and/or $H_{curr}$ is greater than a second threshold (e.g., 64/vSizeY), the residual block of an IBC coded block may be forced to be all zero.
         3) Alternatively, furthermore, signalling of coded block flags (e.g., cu_cbf, tu_cbf_cb, tu_cbf_cr, tu_cbf_luma) may be skipped for above cases.
         4) Alternatively, furthermore, signalling of coded block flags (e.g., cu_cbf, tu_cbf_cb, tu_cbf_cr, tu_cbf_luma) may be kept unchanged, however, a conformance bit stream shall satisfy that the flag is equal to 0.
      iv. In one example, whether to signal coded block flags (e.g., cu_cbf, tu_cbf_cb, tu_cbf_cr, tu_cbf_luma) may depend on the usage of IBC and/or thresholds on allowed IBC sizes.
         1) In one example, when current block is IBC mode, and $W_{curr}$ is greater than MaxTbSizeY and/or $H_{curr}$ is greater than MaxTbSizeY, signalling of coded block flags (e.g., cu_cbf, tu_cbf_cb, tu_cbf_cr, tu_cbf_luma) may be skipped.
         2) In one example, when current block is IBC mode, and $W_{curr}$ is greater than a first threshold (e.g., 64/vSizeX) and/or $H_{curr}$ is greater than a second threshold (e.g., 64/vSizeY), signalling of coded block flags (e.g., cu_cbf, tu_cbf_cb, tu_cbf_cr, tu_cbf_luma) may be skipped.
3. Whether to signal the indication of usage of IBC skip mode may depend on the current block dimensions (width and/or height) and max allowed IBC block size (e.g., vSizeX/vSizeY).
   a. In one example, the cu_skip_flag may not be signaled when $W_{curr}$ is greater than $W_{IBCMax}$ and/or $H_{curr}$ is greater than $H_{IBCMax}$.
      i. Alternatively, the cu_skip_flag may be signaled when $W_{curr}$ is no greater than $W_{IBCMax}$ and/or $H_{curr}$ is no greater than $H_{IBCMax}$.
   b. Alternatively, furthermore, the above method may be invoked when current tile/slice/brick/subpicture is an I tile/slice/brick/subpicture.
   c. In one example, $W_{IBCMax}$ and $H_{IBCMax}$ are both equal to 64.
   d. In one example, $W_{IBCMax}$ is set to vSizeX and $H_{IBCMax}$ is set equal to vSizeY.
   e. In one example, $W_{IBCMax}$ is set to width of max transform block and $H_{IBCMax}$ is set equal to height of max transform block size.

Regarding Recursively Splitting for IBC/Inter Coded Blocks

4. When an IBC/Inter coded block (CU) is split into multiple TBs/TUs without signaling of splitting information (e.g., block size is greater than max transform block size), instead of signaling motion information once for the whole CU, it is proposed to signal or derive motion information multiple times.
   a. In one example, all TBs/TUs may share the same AMVP/Merge flags which may be signaled once.
   b. In one example, the motion candidate list may be constructed once for the whole CU, however, different TB/TU may be assigned with different candidates in the list.
      i. In one example, the indices of assigned candidates may be coded in the bitstream.
   c. In one example, the motion candidate list may be constructed without using the motion information of neighboring TB/TU within the current CU.
      i. In one example, the motion candidate list may be constructed by accessing motion information of spatial neighboring blocks (adjacent or non-adjacent) relative to the current CU.
5. When an IBC/Inter coded block (CU) is split into multiple TBs/TUs without signaling of splitting information (e.g., block size is greater than max transform block size), a first TU/TB may be predicted by at least one reconstructed or predicted sample in a second TU/TB.
  a. The BV validation checking may be performed for each TU/TB separately.
6. When an IBC/Inter coded block (CU) is split into multiple TBs/TUs without signaling of splitting information (e.g., block size is greater than max transform block size), a first TU/TB cannot be predicted by any reconstructed or predicted sample in a second TU/TB.
  a. The BV validation checking may be performed for the whole coded block.

Regarding Prediction Block Generation for IBC Coded Blocks

7. It is proposed to use filtered reconstructed reference samples for IBC prediction block generation.
  a. In one example, the filtered reconstructed reference samples may be generated by applying deblocking filter/bilateral filter/SAO/ALF.
  b. In one example, for an IBC-coded block, at least one reference sample is after filtering and at least one reference sample is before filtering.
8. Both filtered and unfiltered reconstructed reference samples may be used for IBC prediction block generation.
  a. In one example, the filtered reconstructed reference samples may be generated by applying deblocking filter/bilateral filter/SAO/ALF.
  b. In one example, for a prediction for an IBC block, part of the prediction may be from filtered samples and the other part may be from unfiltered samples.
9. Whether to use the filtered or unfiltered values of a reconstructed reference sample for IBC prediction block generation may depend on the position of the reconstructed sample.
  a. In one example, the decision may depend on the relative position of the reconstructed sample to the current CTU and/or to the CTU covering the reference sample.
  b. In one example, if the reference sample is outside current CTU/CTB, or in a different CTU/CTB and has a large distance (e.g., 4-pel) to the CTU boundaries, the corresponding filtered sample may be utilized.
  c. In one example, if the reference sample is within current CTU/CTB, unfiltered reconstructed samples may be utilized to generate the prediction block.
  d. In one example, if the reference sample is outside of current VPDU, the corresponding filtered sample may be utilized.
  e. In one example, if the reference sample is within current VPDU, unfiltered reconstructed samples may be utilized to generate the prediction block.

Regarding MVD coding

Denote a motion vector (or a block vector), or a motion vector difference or a block vector difference by (Vx, Vy).

10. It is proposed to split the absolute value of a component of the motion vector (e.g., Vx or Vy), denoted by AbsV into two parts, with the first part equal to AbsV−((AbsV>>N)<<N) (e.g., AbsV&(1<<N), the least significant N bits) and the other part equal to (AbsV>>N) (e.g., the remaining most significant bits). Each part may be coded individually.
  a. In one example, each component of one motion vector or motion vector difference may be code separately.
    i. In one example, the first part is coded with fixed length coding, e.g., N bits.
      1) Alternatively, a first flag may be coded to indicate whether the first part is equal to 0.
        a. Alternatively, furthermore, if not, code the value of the first part minus 1.
    ii. In one example, the second part with the sign information of the MV/MVD may be coded with current MVD coding method.
  b. In one example, the first part of each component of one motion vector or motion vector difference may be jointly coded, and the second part may be coded separately.
    i. In one example, the first parts of Vx and Vy may be formed to be a new positive value (e.g., (Vx<<N)+Vy)) with 2N bits.
      1) In one example, a first flag may be coded to indicate whether the new positive value is equal to 0.
        a. Alternatively, furthermore, if not, code the value of the new positive minus 1.
      2) Alternatively, the new positive value may be coded with fixed length coding or exp-Golomb coding (e.g., EG-$0^{th}$)
    ii. In one example, the second part of each component of one motion vector with the sign information of the MV/MVD may be coded using the current MVD coding method.
  c. In one example, the first part of each component of one motion vector may be jointly coded, and the second part may be jointly coded as well.
  d. In one example, N is a positive value, such as 1 or 2.
  e. In one example, N may be dependent on the MV precision used for motion vector storage.
    i. In one example, if the MV precision used for motion vector storage is $\frac{1}{2^M}$-pel, N is set to M.
      1) In one example, if the MV precision used for motion vector storage is 1/16-pel, N is equal to 4.
      2) In one example, if the MV precision used for motion vector storage is 1/8-pel, N is equal to 3.
      3) In one example, if the MV precision used for motion vector storage is 1/4-pel, N is equal to 2.
  f. In one example, N may be dependent on the MV precision of current motion vector (e.g., block vectors in IBC).
    i. In one example, if the BV is in 1-pel precision, N may be set to 1.

Regarding SBT

11. Whether to signal the indication of maximum CU width and/or height for allowing subblock transform may depend on the maximum allowed transform block size.
  a. In one example, whether the maximum CU width and height for allowing subblock transform is 64 or 32 luma samples (e.g., sps_sbt_max_size_64_flag) may depend on the value of the maximum allowed transform block size (e.g., sps_max_luma_transform_size_64_flag).
    i. In one example, sps_sbt_max_size_64_flag may be signaled only when both sps_sbt_enabled_flag and sps_max_luma_transform_size_64_flag are true.

Regarding LFNST Matrix Index
- 12. It is proposed to use 2 contexts for coding the usage of LFNST/LFNST matrix index (e.g., lfnst_idx) wherein the selection is purely based on the usage of partition tree.
  - g. In one example, for single tree partition, one context is utilized and for dual tree, another context is utilized regardless of the dependence on primary transform.
- 13. It is proposed to code the usage of LFNST/LFNST matrix index (e.g., lfnst_idx) based on the usage of dual tree and/or slice types and/or color component.

5. Additional Example Embodiments

The changes are highlighted in bold underlined italics. Deleted texts are marked with [[ ]] parenthesis.

5.1 Embodiment #1

TABLE 9-82

Assignment of ctxInc to syntax elements with context coded bins

| Syntax element | binIdx 0 | 1 | 2 | 3 | 4 | >=5 |
|---|---|---|---|---|---|---|
| end_of_brick_one_bit | terminate | na | na | na | na | na |
| ... | | | | | | |
| lfnst_idx[ ][ ] | [[( tu_mts_idx[ x0 ][ y0 ] = = 0 &&)] treeType != SINGLE_TREE [()]] ? 1 : 0 | bypass | na | na | na | na |

5.2 Embodiment #2

7.3.8.5 Coding unit syntax

|  | Descriptor |
|---|---|
| coding_unit( x0, y0, cbWidth, cbHeight, cqtDepth, treeType, modeType ) { <br>   chType = treeType = = DUAL_TREE_CHROMA? 1 : 0 <br>   if( slice_type != I \| \| sps_ibc_enabled_flag [[\| *sps_palette_enabled_flag* ]]) { <br>     if( treeType != DUAL_TREE_CHROMA && <br>      !(((cbWidth = = 4 && cbHeight = = 4) \| \| modeType = = MODE_TYPE_INTRA )&& !(sps_ibc_enabled_flag*&& cbWidth <= MaxTbSizeY && cbHeight <= MaxTbSizeY)*) <br>      ) <br>      cu_skip_flag[ x0 ][ y0 ] <br>     if( cu_skip_flag[ x0 ][ y0 ] = = 0 && slice_type != I <br>      && !( cbWidth = = 4 && cbHeight = = 4 ) && modeType = = MODE_TYPE_ALL ) <br>      pred_mode_flag <br>     if( ( ( slice_type = = I && cu_skip_flag[ x0 ][ y0 ] = =0 ) \| \| <br>      ( slice_type != I && ( CuPredMode[ chType ][ x0 ][ y0 ] != MODE_INTRA \| \| <br>       ( cbWidth = = 4 && cbHeight = = 4 && cu_skip_flag[ x0 ][ y0 ] = = 0 ) ) ) ) && <br>      cbWidth <= *MaxTbSizeY* [[64]] && cbHeight <= *MaxTbSizeY* [[64]] && modeType != MODE_TYPE_INTER && <br>      sps_ibc_enabled_flag && treeType != DUAL_TREE_CHROMA ) <br>     pred_mode_ibc_flag <br>     if( ( ( ( slice_type = = I \| \| ( cbWidth = = 4 && cbHeight = = 4 )\| \| sps_ibc_enabled_flag ) && <br>      CuPredMode[ x0 ][ y0 ] = = MODE_INTRA ) \| \| <br>      ( slice_type != I && !( cbWidth = = 4 && cbHeight = = 4 ) && !sps_ibc_enabled_flag <br>      && CuPredMode[ x0 ][ y0 ] != MODE_INTRA ) ) && sps_palette_enabled_flag && <br>      cbWidth <=64 && cbHeight <=64 && && cu_skip_flag[ x0 ][ y0 ] = = 0 && <br>      modeType != MODE_INTER ) <br>     pred_mode_plt_flag <br>   ... <br> } | <br><br><br><br><br><br><br>ae(v)<br><br><br>ae(v)<br><br><br><br><br><br><br>ae(v)<br><br><br><br><br><br>ae(v) |

Figure 20:
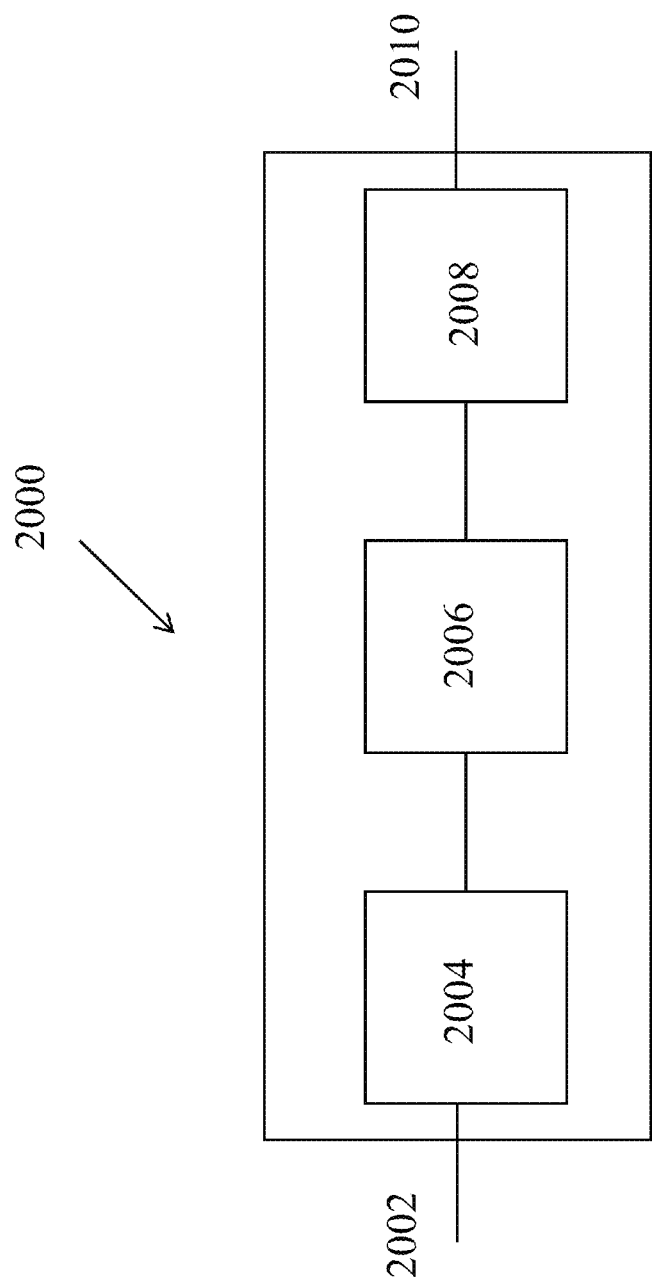
FIG. 20 is a block diagram of an example video processing system in which disclosed techniques may be implemented.

FIG. 20 is a block diagram showing an example video processing system 2000 in which various techniques disclosed herein may be implemented. Various implementations may include some or all of the components of the system 2000. The system 2000 may include input 2002 for receiving video content. The video content may be received in a raw or uncompressed format, e.g., 8 or 10 bit multi-component pixel values, or may be in a compressed or encoded format. The input 2002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 2000 may include a coding component 2004 that may implement the various coding or encoding methods described in the present disclosure. The coding component 2004 may reduce the average bitrate of video from the input 2002 to the output of the coding component 2004 to produce a coded representation of the video. The coding techniques are therefore sometimes called video compression or video transcoding techniques. The output of the coding component 2004 may be either stored, or transmitted via a communication connected, as represented by the component 2006. The stored or communicated bitstream (or coded) representation of the video received at the input 2002 may be used by the component 2008 for generating pixel values or displayable video that is sent to a display interface 2010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 21:
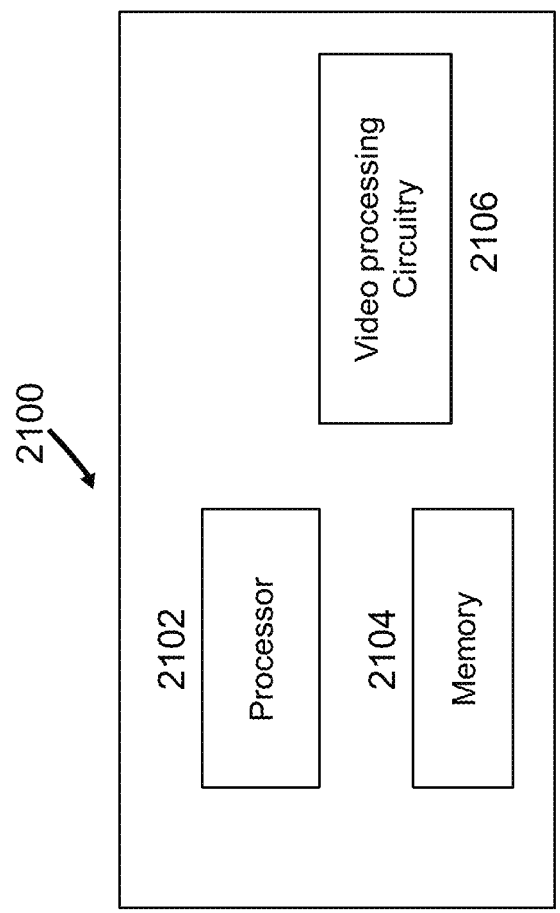
FIG. 21 is a block diagram of an example video processing apparatus.

FIG. 21 is a block diagram of a video processing apparatus 2100. The apparatus 2100 may be used to implement one or more of the methods described herein. The apparatus 2100 may be embodied in a smartphone, tablet, computer, Internet of Things (IoT) receiver, and so on. The apparatus 2100 may include one or more processors 2102, one or more memories 2104 and video processing hardware 2106. The processor(s) 2102 may be configured to implement one or more methods described in the present disclosure. The memory (memories) 2104 may be used for storing data and code used for implementing the methods and techniques described herein. The video processing hardware 2106 may be used to implement, in hardware circuitry, some techniques described in the present disclosure.

The following solutions may be implemented as preferred solutions in some embodiments.

The following solutions may be implemented together with additional techniques described in items listed in the previous section (e.g., item 1).

Figure 22:
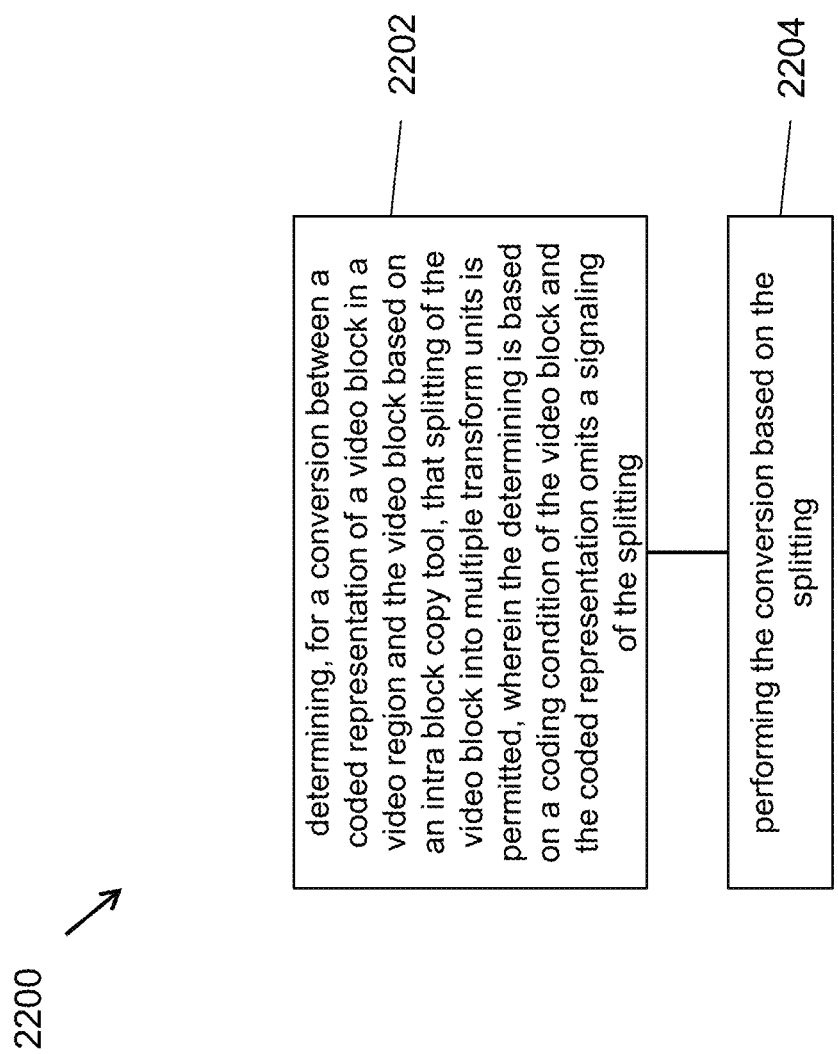
FIG. 22 is a flowchart for an example method of video processing.

1. A method of video processing (e.g., method 2200 depicted in FIG. 22), comprising: determining (2202), for a conversion between a coded representation of a video block in a video region and the video block based on an intra block copy tool, that splitting of the video block into multiple transform units is permitted, wherein the determining is based on a coding condition of the video block and the coded representation omits a signaling of the splitting, and performing (2204) the conversion based on the splitting.
2. The method of solution 1, wherein the coding condition corresponds to a dimension of the video block.
3. The method of solution 2, wherein, due to a width of the video block being greater than a first threshold, it is determined that the splitting is permitted, or due to a height of the video block being greater than a second threshold, it is determined that the splitting is permitted.
4. The method of solution 3, wherein the first threshold and/or the second threshold is equal to a maximum transform size for the video region.
5. The method of any of solutions 1-4, wherein the splitting is recursively applied to the video block.

The following solutions may be implemented together with additional techniques described in items listed in the previous section (e.g., item 2).

6. A method of video processing, comprising: determining, for a conversion between a coded representation of a video block of a video region and the video block, whether an intra block copy (IBC) tool is enabled for the conversion of the video block based on a maximum transform size for the video region; and performing the conversion based on the determining.
7. The method of solution 6, wherein the video block is a chroma block and wherein the maximum transform size corresponds to that of a corresponding luma block, and wherein the IBC is disabled due to the maximum transform size being greater than a threshold.
8. The method of any of solutions 6 or 7, wherein a syntax element in the coded representation indicates whether the IBC tool is enabled due to a dimension of the video block or the maximum transform size meeting a criterion.
9. The method of any of solutions 6-8, wherein, upon determining that the IBC tool is enabled, the conversion further includes forcing a residual block for the video block to all-zeroes based on a zero-forcing condition.

The following solutions may be implemented together with additional techniques described in items listed in the previous section (e.g., item 3).

10. A method of video processing, comprising: determining, for a conversion between a coded representation of a video block of a video region and the video block, whether a signaling of an intra block copy (IBC) tool for the conversion is included in the coded representation; and performing the conversion based on the determining, wherein the determining is based on a width and/or a height of the video block and a maximum allowed IBC block size for the video region.
11. The method of solution 10, wherein the signaling is not included due to the width being greater than a first threshold or the height being greater than a second threshold.

The following solutions may be implemented together with additional techniques described in items listed in the previous section (e.g., item 4).

12. A method of video processing, comprising: determining, for a conversion between a coded representation of a video block of a video region and the video block using an intra block copy (IBC) tool, that splitting of the video block into multiple transform units (TUs) is permitted for the conversion; and performing the conversion based on the determining, wherein the conversion includes use of separate motion information for the multiple TUs.
13. The method of solution 12, wherein the multiple TUs are constrained to share a same advanced motion vector predictor or merge mode flag.
14. The method of solution 12, wherein, during the conversion, a motion information for one of multiple TUs is determined without using a motion information of another of the multiple TUs.

The following solutions may be implemented together with additional techniques described in items listed in the previous section (e.g., item 5).

15. The method of any of solutions 12-14, wherein a first TU of the multiple TUs is predicted from a second TU of the multiple TUs.

The following solutions may be implemented together with additional techniques described in items listed in the previous section (e.g., item 6).

16. The method of any of solutions 12-15, wherein a prediction of a first TU of the multiple TUs from a second TU of the multiple TUs is disabled.

The following solutions may be implemented together with additional techniques described in items listed in the previous section (e.g., item 7).

17. A method of video processing, comprising: determining, for a conversion between a coded representation of a video block of a video region and the video block, that an intra block copy tool is enabled for the conversion, and performing the conversion using the intra block copy tool, wherein a prediction of the video block is performed using filtered reconstructed samples of the video region.

18. The method of solution 17, wherein the filtered reconstructed samples include samples generated by applying an in-loop filter to the reconstructed samples, wherein the in-loop filter is a deblocking filter or a bilateral filter or a sample adaptive offset or an adaptive loop filter.

The following solutions may be implemented together with additional techniques described in items listed in the previous section (e.g., item 8).

19. The method of any of solutions 17-18, wherein, based on rule, the prediction further selectively uses unfiltered reconstructed samples of the video region.

The following solutions may be implemented together with additional techniques described in items listed in the previous section (e.g., item 9).

20. The method of solution 19, wherein the rule depends on a position of the reconstructed samples.
21. The method of solution 20, wherein the position of the reconstructed sample used for the rule is a relative position of the reconstructed sample with respect to a coding tree unit of the video block.

The following solutions may be implemented together with additional techniques described in items listed in the previous section (e.g., item 10).

22. A method of video processing, comprising: performing a conversion between a video comprising multiple video blocks and coded representation of the video, wherein at least some video blocks are coded using motion vector information and wherein the motion vector information is represented in the coded representation as a first part based on a first lower significant bits of an absolute value of the motion vector information and a second part based on remaining more significant bits that are more significant than the first lower significant bits.
23. The method of solution 22, wherein an absolute value of a motion vector V, represented as AbsV is split into the first part first part equal to AbsV−((AbsV>>N)<<N) or AbsV&(1<<N), and the second part is equal to (AbsV>>N), where N is an integer.
24. The method of any of solutions 22-23, wherein the first part and the second part are coded separately in the coded representation.
25. The method of any of solutions 22-24, wherein a first part of an x motion vector is jointly coded with a first part of a y motion vector at same position.
26. The method of solution 25, wherein a second part of the x motion vector and a second part of the y motion vector are separately coded.
27. The method of any of solutions 22-26, wherein N is a function of a precision used for storage of motion vectors.

The following solutions may be implemented together with additional techniques described in items listed in the previous section (e.g., item 11).

28. A method of video processing, comprising: determining, for a conversion between a coded representation of a video block of a video region and the video block, whether a subblock transform tool is enabled for the conversion; and performing the conversion based on the determining, wherein the determining is based on a maximum allowed transform block size for the video region, and wherein a signaling is included in the coded representation conditionally based on the maximum allowed transform block size.

The following solutions may be implemented together with additional techniques described in items listed in the previous section (e.g., items 12, 13).

29. A method of video processing, comprising: determining, for a conversion between a coded representation of a video block of a video region and the video block, whether a low frequency non-separable transform (LFNST) is used during the conversion, and performing the conversion based on the determining; wherein the determining is based on a coding condition applied to the video block and wherein the LFNST and a matrix index for the LFNST are coded in the coded representation using two contexts.
30. The method of solution 29, wherein the coding condition includes a partition tree used, or a slice type of the video block or a color component identity of the video block.
31. The method of any of solutions 1-30, wherein the video region comprises a coding unit and wherein the video block corresponds to a luma or a chroma component of the video region.
32. The method of any of solutions 1 to 31, wherein the conversion includes generating the bitstream representation from the current video block.
33. The method of any of solutions 1 to 31, wherein the conversion includes generating samples of the current video block from the bitstream representation.
34. A video processing apparatus comprising a processor configured to implement a method recited in any one or more of solutions 1 to 33.
35. A computer readable medium having code stored thereon, the code, upon execution, causing a processor to implement a method recited in any one or more of solutions 1 to 33.
36. A method, system or apparatus described herein.

Figure 23:
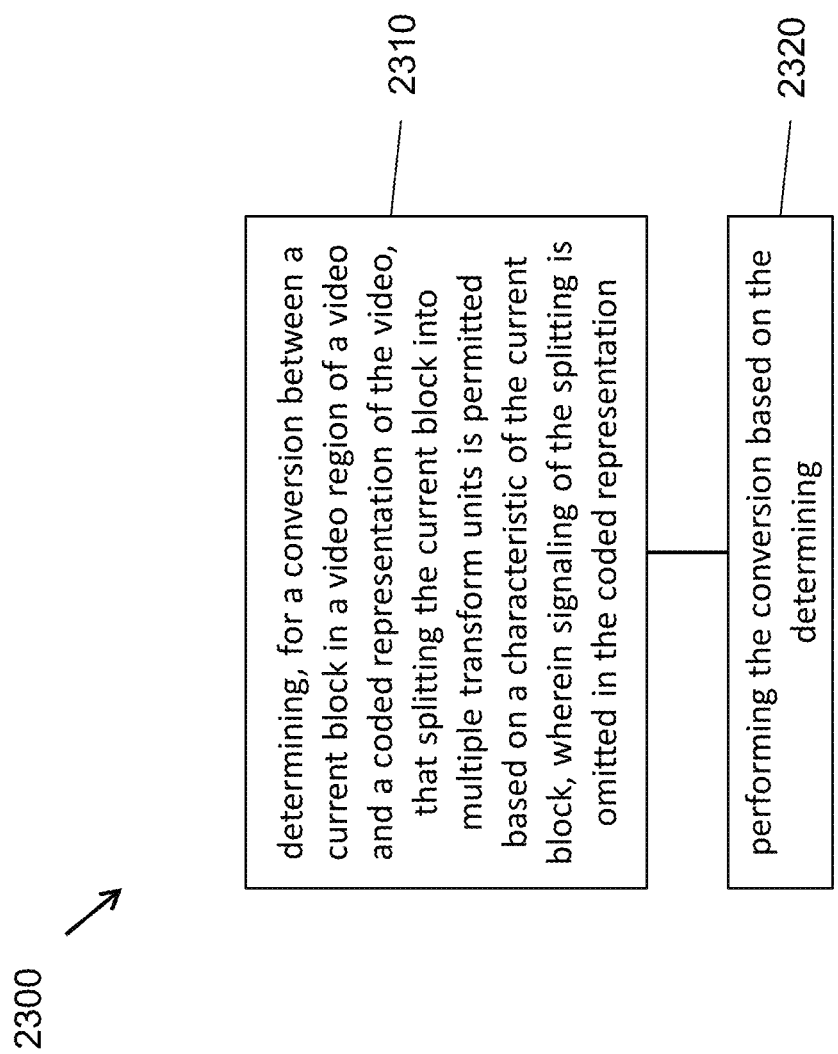
FIG. 23 is a flowchart representation of a method for video processing in accordance with the present technology.

FIG. 23 is a flowchart representation of a method 2300 for video processing in accordance with the present technology. The method 2300 includes, at operation 2310, determining, for a conversion between a current block in a video region of a video and a coded representation of the video, that splitting the current block into multiple transform units is permitted based on a characteristic of the current block. A signaling of the splitting is omitted in the coded representation. The method 2300 includes, at operation 2320, performing the conversion based on the determining.

In some embodiments, the characteristic of the current block comprises a dimension of the current block. In some embodiments, the splitting is invoked for the conversion in case a width of the current block is greater than a first threshold. In some embodiments, the splitting is invoked for the conversion in case a height of the current block is greater than a second threshold. In some embodiments, the splitting of the current block includes recursively splitting the current block until a dimension of one of the multiple transform units is equal to or smaller than a threshold. In some embodiments, a width of the current block is divided by half recursively until the width of the current block is smaller than or equal to a first threshold. In some embodiments, a height of the current block is divided by half recursively until the height of the current block is smaller than or equal to a second threshold. In some embodiments, the current block is recursively split until the width of the current block is smaller than or equal to a first threshold and the height of the current block is smaller than or equal to a second threshold. In some embodiments, the first threshold is equal to a maximum transform size for the video region. In some embodiments, the second threshold is equal to a maximum transform size for the video region.

In some embodiments, at least a subset of the multiple transform units shares same motion information. In some embodiments, the same motion information comprises a syntax flag for an advanced motion vector prediction mode or a merge mode that is signaled once in the coded representation for the current block. In some embodiments, motion information is determined multiple times for the current block in the coded representation. In some embodiments, a motion candidate list is constructed once for the current block, and the multiple transform units are assigned with different candidates in the motion candidate list. In some embodiments, indices of the different candidates are signaled in the coded representation. In some embodiments, for a transform unit of the multiple transform unit, the motion candidate list is constructed without using motion information of neighboring transform unit within the current block. In some embodiments, the motion candidate list is constructed using motion information of spatial neighboring blocks of the current block. In some embodiments, a first transform unit is reconstructed based on at least one reconstructed sample in a second transform unit. In some embodiments, a validation check is performed for each of the multiple transform units separately. In some embodiments, a first transform unit is predicted without using any reconstruction samples in other transform units. In some embodiments, a validation check is performed for the block after the block is reconstructed.

Figure 24:
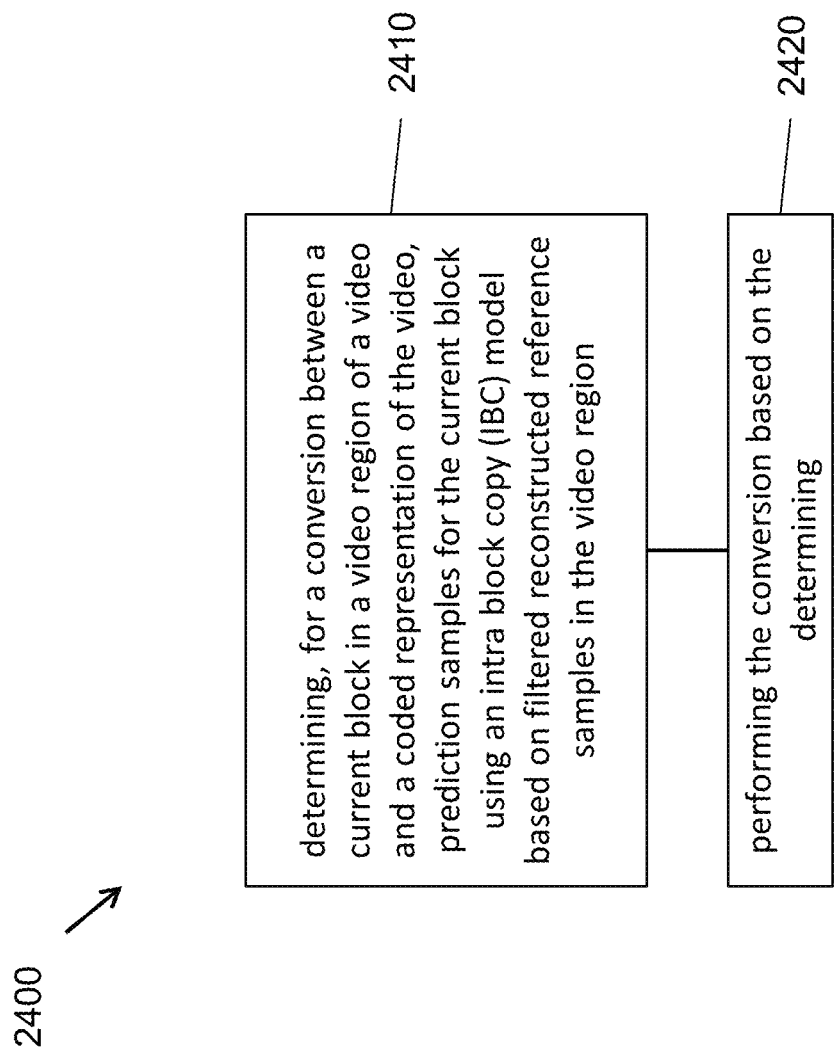
FIG. 24 is a flowchart representation of another method for video processing in accordance with the present technology.

FIG. 24 is a flowchart representation of a method 2400 for video processing in accordance with the present technology. The method 2400 includes, at operation 2410, determining, for a conversion between a current block in a video region of a video and a coded representation of the video, prediction samples for the current block using an intra block copy (IBC) model based on filtered reconstructed reference samples in the video region. The method 2400 includes, at operation 2420, performing the conversion based on the determining.

In some embodiments, the filtered reconstructed reference samples are generated based on a filtering operation that comprises at least one of a deblocking filtering operation, a bilateral filtering operation, a sample adaptive offset (SAO) filtering operation, or an adaptive loop filtering operation. In some embodiments, the determining of the prediction samples for the current block using the IBC model is further based on unfiltered reference samples in the video region. In some embodiments, prediction samples in a first part of the current block are determined based on the filtered reconstructed reference samples and prediction samples in a second part of the current block are determined based on the unfiltered reconstructed reference sample. In some embodiments, whether a filtered reconstructed reference sample or an unfiltered reconstructed reference sample is to be used to determine a prediction sample for the block is based on a position of the prediction sample relative to a current coding tree unit or a coding tree unit that covers the sample. In some embodiments, the filtered reconstructed reference sample is used to reconstruct the prediction sample in case the prediction sample is positioned outside of the current coding tree unit. In some embodiments, the filtered reconstructed reference sample is used to reconstruct the prediction sample in case the prediction sample is positioned within a coding tree unit and has a distance D from one or more boundaries of the coding tree unit, D being equal to or greater than 4-pel. In some embodiments, the unfiltered reconstructed reference sample is to be used to reconstruct the prediction sample in case the prediction sample is positioned within the current coding tree unit. In some embodiments, the filtered reconstructed reference sample is to be used to reconstruct the prediction sample in case the prediction sample is positioned outside of a current virtual pipeline data unit. In some embodiments, the unfiltered reconstructed reference sample is to be used to reconstruct the prediction sample in case the prediction sample is positioned within a current virtual pipeline data unit.

Figure 25:
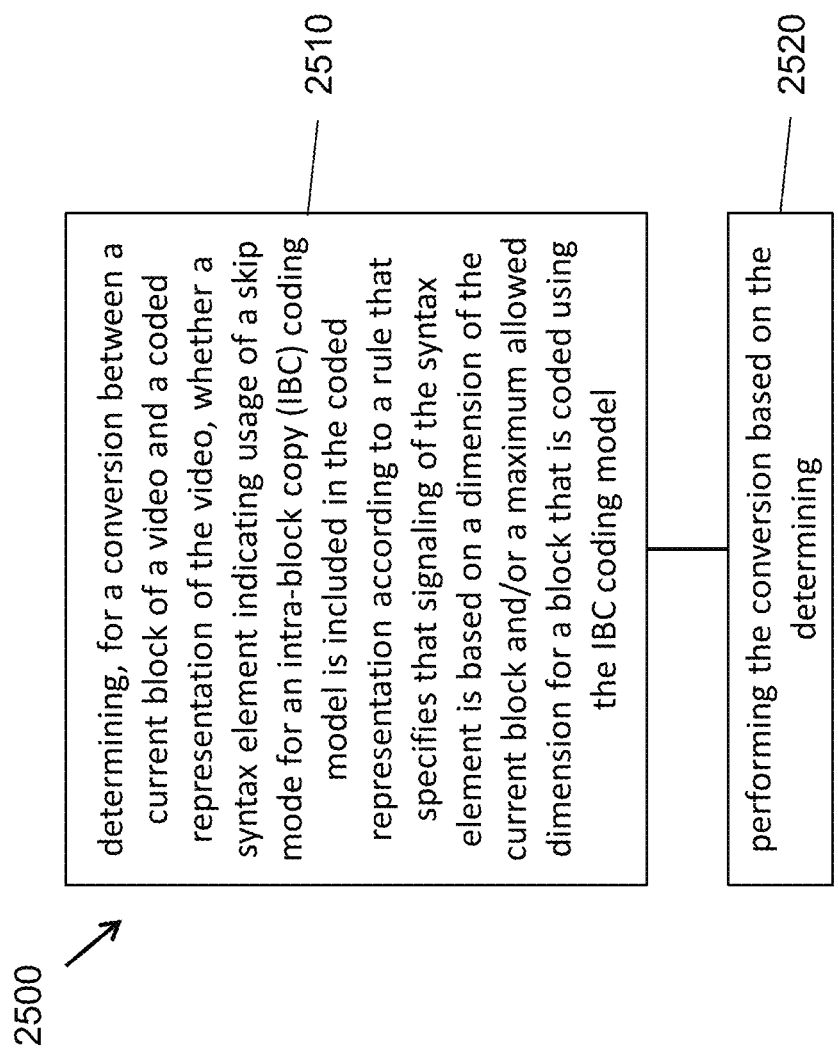
FIG. 25 is a flowchart representation of another method for video processing in accordance with the present technology.

FIG. 25 is a flowchart representation of a method 2500 for video processing in accordance with the present technology. The method 2500 includes, at operation 2510, determining, for a conversion between a current block of a video and a coded representation of the video, whether a syntax element indicating usage of a skip mode for an intra-block copy (IBC) coding model is included in the coded representation according to a rule. The rule specifies that signaling of the syntax element is based on a dimension of the current block and/or a maximum allowed dimension for a block that is coded using the IBC coding model. The method 2500 also includes, at operation 2520, performing the conversion based on the determining.

In some embodiments, the rule specifies that the syntax element is omitted in the coded representation in case a width of the current block is greater than a maximum allowed width. In some embodiments, the rule specifies that the syntax element is omitted in the coded representation in case a height of the current block is greater than a maximum allowed height. In some embodiments, the rule specifies that the syntax element is included in the coded representation in case a width of the current block is smaller than or equal to a maximum allowed width. In some embodiments, the rule specifies that the syntax element is included in the coded representation in case a height of the current block is smaller than or equal to a maximum allowed height.

In some embodiments, the current block is in a video region of the video, and wherein the rule is applicable in case the video region comprises an I tile, an I slice, an I brick, or an I subpicture. In some embodiments, the maximum allowed width or the maximum allowed height is 64. In some embodiments, the maximum allowed width or the maximum allowed height is equal to a dimension of a virtual pipeline data unit. In some embodiments, the maximum allowed width or the maximum allowed height is equal to a maximum dimension of a transform unit.

Figure 26:
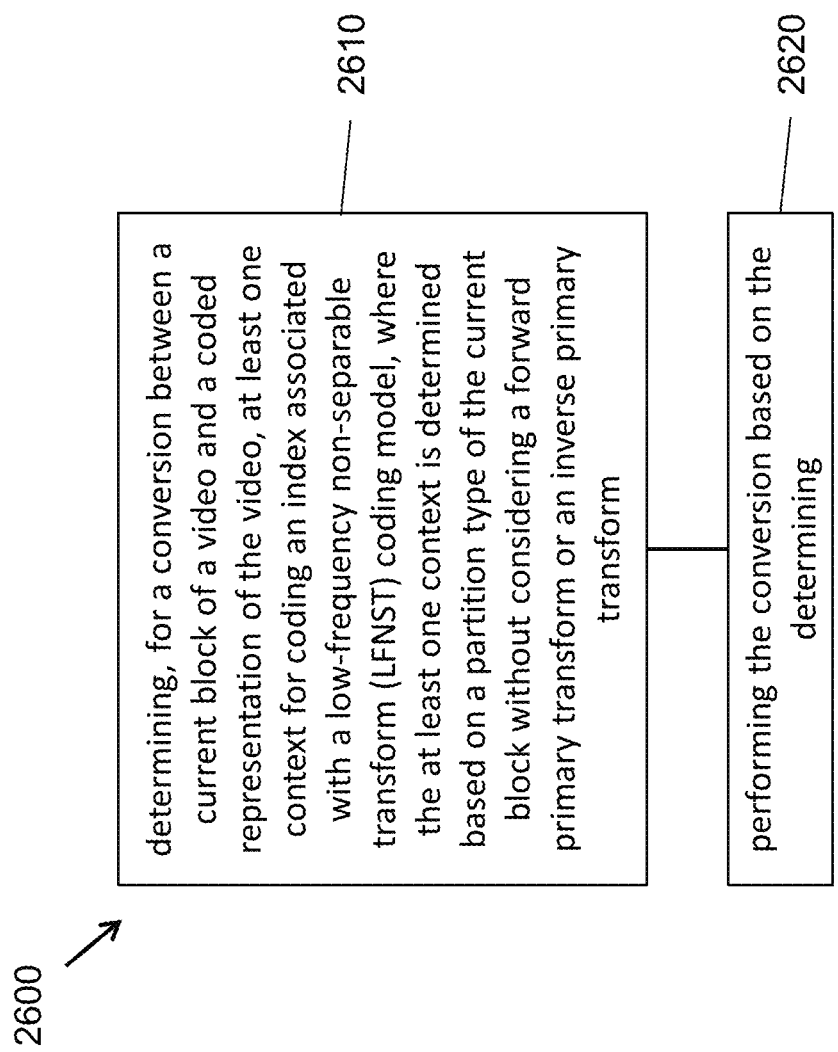
FIG. 26 is a flowchart representation of another method for video processing in accordance with the present technology.

FIG. 26 is a flowchart representation of a method 2600 for video processing in accordance with the present technology. The method 2600 includes, at operation 2610, determining, for a conversion between a current block of a video and a coded representation of the video, at least one context for coding an index associated with a low-frequency non-separable transform (LFNST) coding model. The LFNST coding model comprises, during encoding, applying a forward secondary transform between a forward primary transform and a quantization step, or applying, during decoding, an inverse secondary transform between a de-quantization step and an inverse primary transform. Sizes of the forward secondary transform and the inverse secondary transform are less than a size of the current block. The at least one context is determined based on a partition type of the current block without considering the forward primary transform or the inverse primary transform. The method 2600 also includes, at operation 2620, performing the conversion according to the determining.

In some embodiments, only one context is used for coding the index in case the partition type is a single tree partition.

In some embodiments, two contexts are used for coding the index in case the partition type is a dual tree partition.

In some embodiments, an index indicating the usage of the low-frequency non-separable transform (LFNST) coding model is included in the coded representation based on a characteristic associated with the block, the characteristic comprising the partition type, a slice type, or a color component associated with the current block.

Figure 27:
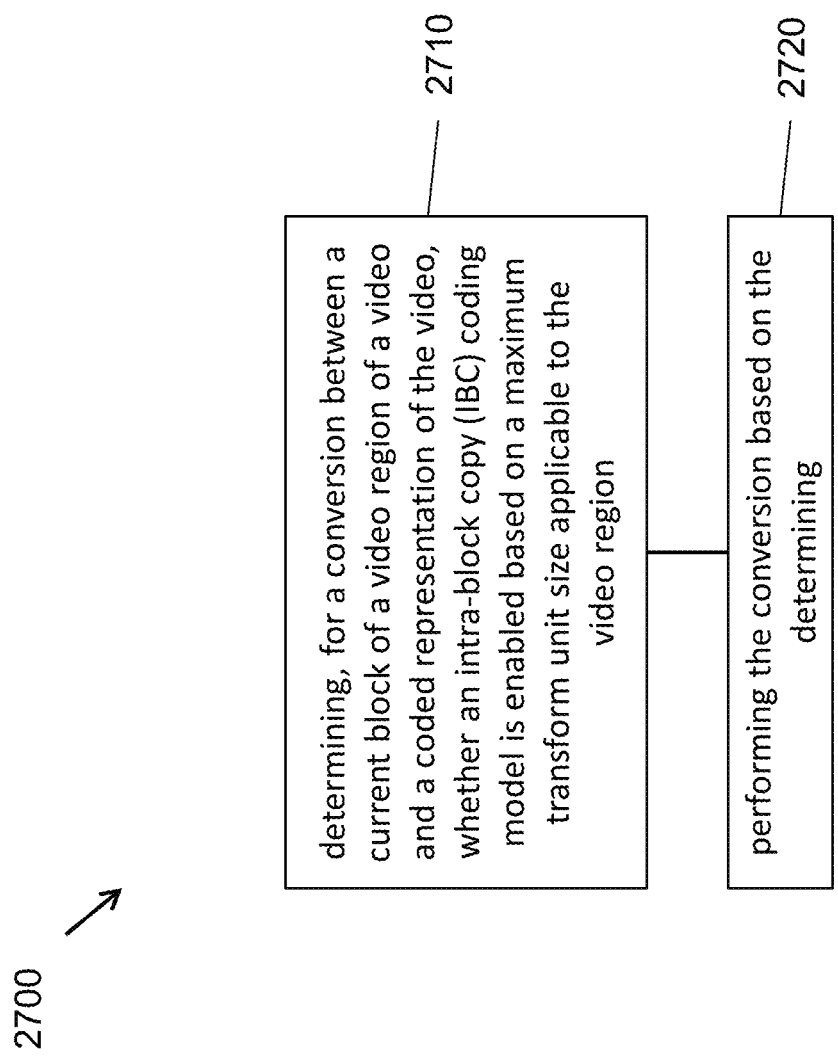
FIG. 27 is a flowchart representation of another method for video processing in accordance with the present technology.

FIG. 27 is a flowchart representation of a method 2700 for video processing in accordance with the present technology. The method 2700 includes, at operation 2710, determining, for a conversion between a current block of a video region of a video and a coded representation of the video, whether an intra-block copy (IBC) coding model is enabled based on a maximum transform unit size applicable to the video region. The method 2700 also includes, at operation 2720, performing the conversion according to the determining.

In some embodiments, the IBC coding model is disabled in case a dimension of the current block or a dimension of a luma block that corresponds to the current block is greater than the maximum transform unit size. In some embodiments, the IBC coding model is disabled in case a width of the current block or a width of a luma block that corresponds to the current block is greater than a maximum transform unit width. In some embodiments, the IBC coding model is disabled in case a height of the current block or a height of a luma block that corresponds to the current block is greater than the maximum transform height. In some embodiments, a manner of signaling usage of the IBC coding model in the coded representation is based on a dimension of the current block and the maximum transform unit size. In some embodiments, signaling the usage of the IBC coding model comprises a syntax element indicating a skip mode of the IBC coding model. In some embodiments, the syntax element is included in an I tile, an I slice, an I brick, or an I subpicture in the coded representation.

In some embodiments, signaling the usage of the IBC coding model comprises a syntax element indicating the IBC mode. In some embodiments, the syntax element is omitted in the coded representation in case the width of the current block is greater than a maximum transform unit width, or the height of the current block is greater than a maximum transform unit height. In some embodiments, the syntax element is included in the coded representation in case the width of the current block is smaller than or equal a maximum transform unit width, or the height of the current block is smaller than or equal to a maximum transform unit height. In some embodiments, the syntax element is included in the coded representation and set to 0 in case the width of the current block is greater than a maximum transform unit width, or the height of the current block is greater than a maximum transform unit height.

In some embodiments, in case the IBC coding model is enabled for the current block, samples in a residual block corresponding to the current block are set to 0 according to a rule. In some embodiments, the rule specifies that the samples are set to 0 in case the width of the current block is greater than a maximum transform unit width, or the height of the current block is greater than a maximum transform unit height. In some embodiments, the rule specifies that the samples are set to 0 in case the width of the current block is greater than a first threshold, or the height of the current block is greater than a second threshold. In some embodiments, the first threshold is 64/vSizeX, vSizeX being a width of a virtual pipeline data unit. In some embodiments, the second threshold is 64/vSizeY, vSizeY being a height of a virtual pipeline data unit. In some embodiments, syntax flags for coded blocks are omitted in the coded representation. In some embodiments, syntax flags for coded blocks are set to 0 in the coded representation.

In some embodiments, signaling of syntax flags for coded blocks in the coded representation is based on the usage of the IBC coding model. In some embodiments, in case the IBC coding model is enabled for the current block and the dimension of the block is greater than the maximum transform unit size, the syntax flags are omitted in the coded representation. In some embodiments, in case the IBC coding model is enabled for the current block and the dimension of the block is greater than a threshold associated with a virtual pipeline data unit, the syntax flags are omitted in the coded representation.

Figure 28:
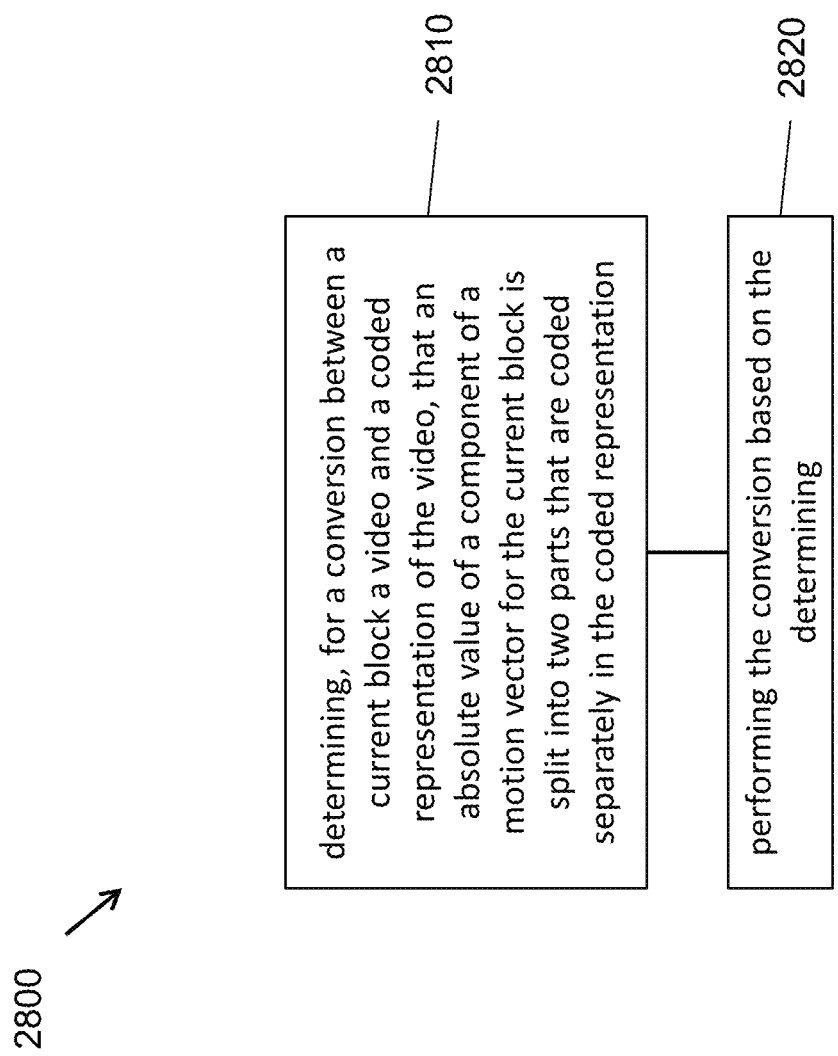
FIG. 28 is a flowchart representation of another method for video processing in accordance with the present technology.

FIG. 28 is a flowchart representation of a method 2800 for video processing in accordance with the present technology. The method 2800 includes, at operation 2810, determining, for a conversion between a current block a video and a coded representation of the video, that an absolute value of a component of a motion vector for the current block is split into two parts. The motion vector is denoted as (Vx, Vy) and the component is denoted as Vi, Vi being either Vx or Vy. A first part of the two parts is equal to $|Vi|-((|Vi|>>N)<<N)$ and a second part of the two parts is equal to $|Vi|>>N$, N being a positive integer. The two parts are coded separately in the coded representation. The method 2800 also includes, at operation 2820, performing the conversion according to the determining.

In some embodiments, the two components Vx and Vy are signaled separately in the coded representation. In some embodiments, the first part is coded with a fixed length of N bits. In some embodiments, the first part of the component Vx and the first part of the component Vy are coded jointly, and the second part of the component Vx and the second part of the component Vy are coded separately. In some embodiments, the first part of the component Vx and the first part of the component Vy are coded as a value having a length of 2N bits. In some embodiments, the value is equal to $(Vx<<N)+Vy$. In some embodiments, the value is coded using a fixed length coding process or an exp-Golomb coding process.

In some embodiments, the first part of the component Vx and the first part of the component Vy are coded jointly, and the second part of the component Vx and the second part of the component Vy are coded jointly. In some embodiments, a syntax flag is included in the coded representation to indicate whether the first part is equal to 0. In some embodiments, the first part has a value of K, where $K \neq 0$ and a value of (K−1) is coded in the coded representation. In some embodiments, the second part of each component with sign information is coded using a motion vector difference coding process. In some embodiments, N is 1 or 2. In some embodiments, N is determined based on a motion vector precision used for motion vector data storage. In some embodiments, N is 4 in case the motion vector precision is 1/16-pel. In some embodiments, N is 3 in case the motion vector precision is 1/8-pel. In some embodiments, N is 2 in case the motion vector precision is 1/4-pel. In some embodiments, N is determined based on a motion vector precision of a current motion vector. In some embodiments, N is 1 in case the motion vector precision is 1-pel.

Figure 29:
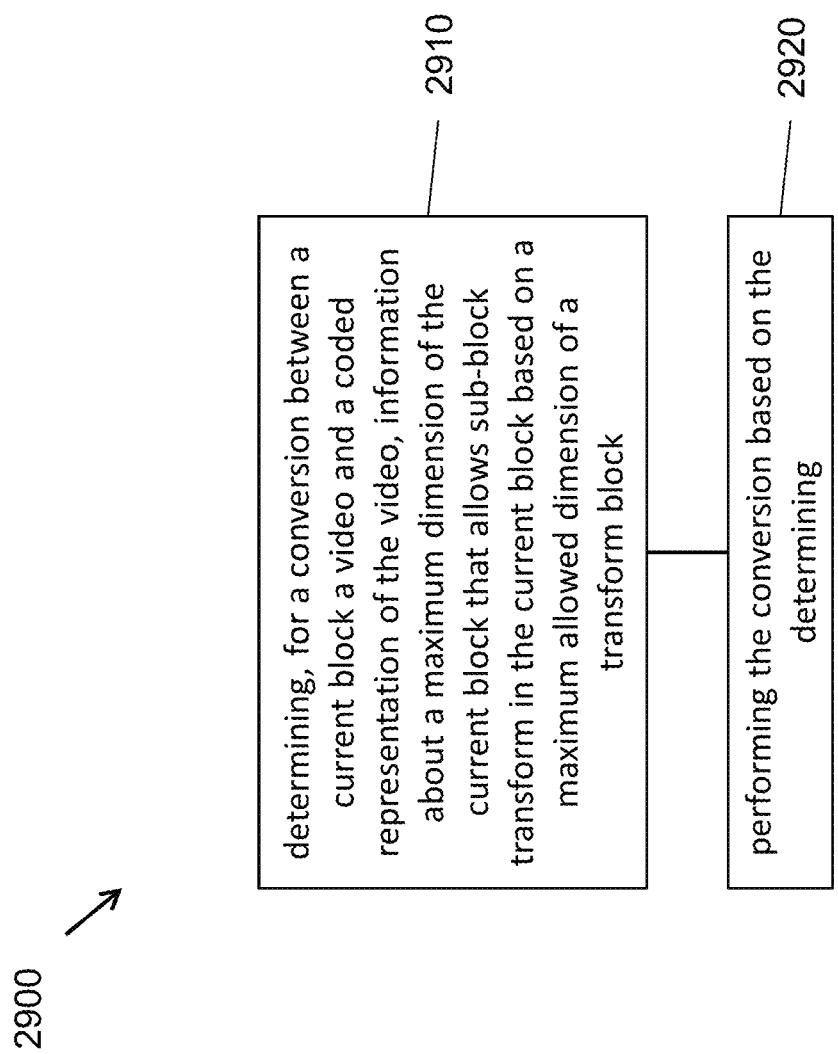
FIG. 29 is a flowchart representation of yet another method for video processing in accordance with the present technology.

FIG. 29 is a flowchart representation of a method 2900 for video processing in accordance with the present technology. The method 2900 includes, at operation 2910, determining, for a conversion between a current block a video and a coded representation of the video, information about a maximum dimension of the current block that allows sub-block transform in the current block based on a maximum allowed dimension of a transform block. The method 2900 also includes, at operation 2920, performing the conversion according to the determining.

In some embodiments, the maximum dimension of the current block that allows sub-block transform in the current block corresponds to the maximum allowed dimension of transform block. In some embodiments, the maximum dimension of the current block is 64 or 32. In some embodiments, a syntax flag indicating the maximum dimension of the current block is included in the coded representation in case a first syntax flag in a slice parameter set indicates that sub-block transform is enabled and a second syntax flag in the slice parameter set indicates that the maximum allowed dimension of a transform block is 64.

In some embodiments, the conversion includes generating the coded representation from the current block. In some embodiments, the conversion includes generating samples of the current block from the coded representation.

In the above solutions, the performing the conversion includes using the results of previous decision step (e.g., using or not using certain coding or decoding steps) during the encoding or decoding operation to arrive at the conversion results.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method for processing video data, comprising:
   determining, for a first conversion between a first video block of a video and a bitstream of the video, whether a width of the first video block is greater than a first threshold or a height of the first video block is greater than a second threshold;
   invoking, a partition operation of the first video block to obtain two or more transform blocks when the width of the first video block is greater than the first threshold or the height of the first video block is greater than the second threshold; and
   performing the first conversion based on the determining, wherein a signaling of the invoking and a signaling of the partition operation are omitted in the bitstream,
   wherein the first threshold and the second threshold are equal to a first value which specifies a maximum transform size in luma samples, and
   wherein the method further comprises:
   determining whether a third syntax element is included in the bitstream for the first video block,
   wherein the third syntax element specifies whether and which one of low frequency non-separable transform (LFNST) kernels in a selected transform set is used,
   wherein a single context selected from contexts with an index increasement of 0 or 1 is used for a first bin of the third syntax element, and
   wherein the index increasement is determined only based on whether a tree type of the current first video block being a single tree.

2. The method of claim 1, wherein the index increasement is 0 in response to the tree type of the first video block being the single tree, and the index increasement is 1 in response to the tree type of the first video block not being the single tree.

3. The method of claim 1, wherein the third syntax element is associated with a LFNST coding model,
   wherein the LFNST coding model comprises, applying, during encoding, a forward secondary transform between a forward primary transform and a quantization step, or applying, during decoding, an inverse secondary transform between a de-quantization step and an inverse primary transform, and
   wherein the index increasement is determined excluding referring to the forward primary transform or the inverse primary transform.

4. The method of claim 1, wherein in the partition operation, whether the width of the first video block being split is further determined based on the height of the first video block, and whether the height of the first video block being split is determined based on the width of the first video block.

5. The method of claim 4, wherein in the partition operation, the width of the first video block is split by half when the width of the first video block is greater than the first value and is greater than the height of the first video block.

6. The method of claim 5, wherein in the partition operation, the height of the first video block is kept unchanged when the width of the first video block is greater than the first value and is greater than the height of the first video block.

7. The method of claim 4, wherein in the partition operation, the height of the first video block is split by half when the height of the first video block is greater than the first value, and the width of the first video block is less than or equal to at least one of 1) the first value, or 2) the height of the first video block.

8. The method of claim 7, wherein in the partition operation, the width of the first video block is kept unchanged when the height of the first video block is greater than the first value, and the width of the first video block is less than or equal to at least one of 1) the first value, or 2) the height of the first video block.

9. The method of claim 1, wherein the partition operation is invoked recursively until the width of the first video block is less than or equal to the first threshold and the height is less than or equal to the second threshold.

10. The method of claim 1, wherein the partition operation is invoked when the first value is equal to 32 and the first video block is derived based on a coding block coded in a prediction mode in which prediction samples are derived from blocks of sample values of a same video region as determined by block vectors, and
    wherein a width of the coding block and a height of the coding block are less than or equal to 64 and greater than 32.

11. The method of claim 1, wherein the first conversion includes encoding the video into the bitstream.

12. The method of claim 1, wherein the first conversion includes decoding the video from the bitstream.

13. The method according to claim 1, further comprising:
    determining, for a second conversion between a second video block of the video and the bitstream of the video, whether a first syntax element is included in the bitstream according to a first rule; and
    performing the second conversion at least based on the determining,
    wherein the first syntax element indicates whether a prediction mode is applied to the second video block,
    wherein in the prediction mode, prediction samples are derived from blocks of sample values of a same video region as determined by block vectors, and
    wherein the first rule specifies that the first syntax element is not included in the bitstream when a width of the second video block is greater a third threshold and a height of the second video block is greater a fourth threshold.

14. The method of claim 13, further comprising determining whether a second syntax element indicating whether a skip mode is applied to the second video block is included in the bitstream according to a second rule,
wherein the second rule specifies that the second syntax element is included in the bitstream when the second video block is not a chroma block with a tree type of dual tree, a sequence enabled flag indicates that the prediction mode is enabled, the width of the second video block is less than or equal to the third threshold, and the height of the second video block is less than or equal to the fourth threshold.

15. The method of claim 14, wherein the third threshold and the fourth threshold are 64, or wherein the third threshold and the fourth threshold are equal to a size of a virtual unit when a size of a coding tree block is greater than 64.

16. An apparatus for processing video data comprising a processor and a non-transitory memory with instructions thereon, wherein the instructions upon execution by the processor, cause the processor to:
determine, for a first conversion between a first video block of a video and a bitstream of the video, whether a width of the first video block is greater than a first threshold or a height of the first video block is greater than a second threshold;
invoke, a partition operation of the first video block to obtain two or more transform blocks when the width of the first video block is greater than the first threshold or the height of the first video block is greater than the second threshold; and
perform the first conversion based on the determining,
wherein a signaling of the invoking and a signaling of the partition operation are omitted in the bitstream,
wherein the first threshold and the second threshold are equal to a first value which specifies a maximum transform size in luma samples, and
wherein the instructions upon execution by the processor, further cause the processor to: determine whether a third syntax element is included in the bitstream for the first video block,
wherein the third syntax element specifies whether and which one of low frequency non-separable transform (LFNST) kernels in a selected transform set is used,
wherein a single context selected from contexts with an index increasement of 0 or 1 is used for a first bin of the third syntax element, and
wherein the index increasement is determined only based on whether a tree type of the current first video block being a single tree.

17. A non-transitory computer-readable storage medium storing instructions that cause a processor to:
determine, for a first conversion between a first video block of a video and a bitstream of the video, whether a width of the first video block is greater than a first threshold or a height of the first video block is greater than a second threshold;
invoke, a partition operation of the first video block to obtain two or more transform blocks when the width of the first video block is greater than the first threshold or the height of the first video block is greater than the second threshold; and
perform the first conversion based on the determining,
wherein a signaling of the invoking and a signaling of the partition operation are omitted in the bitstream,
wherein the first threshold and the second threshold are equal to a first value which specifies a maximum transform size in luma samples, and
wherein the non-transitory computer-readable storage medium stores instructions that further cause the processor to:
determine whether a third syntax element is included in the bitstream for the first video block, wherein the third syntax element specifies whether and which one of low frequency non-separable transform (LFNST) kernels in a selected transform set is used,
wherein a single context selected from contexts with an index increasement of 0 or 1 is used for a first bin of the third syntax element, and
wherein the index increasement is determined only based on whether a tree type of the first video block being a single tree.

18. A non-transitory computer-readable recording medium storing a bitstream which is generated by a method performed by a video processing apparatus, wherein the method comprises:
determining, for a first video block of a video, whether a width of the first video block is greater than a first threshold or a height of the first video block is greater than a second threshold;
invoking, a partition operation of the first video block to obtain two or more transform blocks when the width of the first video block is greater than the first threshold or the height of the first video block is greater than the second threshold; and
generating the bitstream based on the determining,
wherein a signaling of the invoking and a signaling of the partition operation are omitted in the bitstream,
wherein the first threshold and the second threshold are equal to a first value which specifies a maximum transform size in luma samples, and
wherein the method further comprises:
determining whether a third syntax element is included in the bitstream for the first video block,
wherein the third syntax element specifies whether and which one of low frequency non-separable transform (LFNST) kernels in a selected transform set is used,
wherein a single context selected from contexts with an index increasement of 0 or 1 is used for a first bin of the third syntax element, and
wherein the index increasement is determined only based on whether a tree type of the current first video block being a single tree.

* * * * *